(12) United States Patent
Bonawitz et al.

(10) Patent No.: US 9,836,063 B1
(45) Date of Patent: Dec. 5, 2017

(54) SELECTION BETWEEN EXPLORE MODE AND CONTROL MODE FOR AERIAL VEHICLE

(71) Applicant: X Development LLC, Mountain View, CA (US)

(72) Inventors: Keith Allen Bonawitz, Watchung, NJ (US); Johan Mathe, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 63 days.

(21) Appl. No.: 14/962,180

(22) Filed: Dec. 8, 2015

(51) Int. Cl.
*G05D 1/04* (2006.01)
*B64B 1/40* (2006.01)

(52) U.S. Cl.
CPC ............... *G05D 1/042* (2013.01); *B64B 1/40* (2013.01)

(58) Field of Classification Search
CPC ................................. G05D 1/042; B64B 1/40
See application file for complete search history.

(56) References Cited

U.S. PATENT DOCUMENTS

| | | | |
|---|---|---|---|
| 7,356,390 B2 | 4/2008 | Knoblach et al. | |
| 7,469,857 B2 | 12/2008 | Voss | |
| 8,820,678 B2 | 9/2014 | DeVaul et al. | |
| 9,139,279 B2 | 9/2015 | Heppe | |
| 2010/0230968 A1* | 9/2010 | Chernyshov | F03D 5/00 290/44 |

* cited by examiner

*Primary Examiner* — Michael D Lang
(74) *Attorney, Agent, or Firm* — McDonnell Boehnen Hulbert & Berghoff LLP

(57) ABSTRACT

Example implementations may relate to selection between a first mode and a second mode. The first mode may involve (i) directing an aerial vehicle (e.g., in an aerial network including a plurality of aerial vehicles) to navigate to each of a plurality of altitudes and (ii) determining respective wind-related data at each respective altitude. Whereas, the second mode may involve (i) selecting at least one altitude based on the determined wind-related data and (ii) directing the aerial vehicle to reposition to the at least one selected altitude. As such, a control system may determine flight data for the aerial vehicle. Based on the flight data, the control system may make a selection between the first mode and the second mode. And based on the selection, the control system may then operate the aerial vehicle according to the first mode or may operate the aerial vehicle according to the second mode.

18 Claims, 21 Drawing Sheets

SELECTION BETWEEN EXPLORE MODE AND CONTROL MODE FOR AERIAL VEHICLE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

Example embodiments relate to a control system that is arranged to operate an aerial vehicle according to an explore mode or according to a control mode. During the explore mode, the aerial vehicle may be directed to navigate through various altitudes so as to obtain information at these altitude, such as information related to wind conditions at these altitudes for instance. And during the control mode, the aerial vehicle may be directed to specific altitudes at which the aerial vehicle could carry out various operations, such as providing services to various devices. Given these modes, the control system may thus be arranged to select between these modes and may do so based on various considerations, such as based on uncertainty regarding wind conditions, a fixed schedule, movement capabilities of the aerial vehicle, resource availability of the aerial vehicle, and/or services being provided by the aerial vehicle, among others.

In one aspect, a method is provided. The method involves determining, by a control system, flight data for a particular aerial vehicle in an aerial network including a plurality of aerial vehicles. The method also involves, based at least in part on the flight data, the control system making a selection between a first mode and a second mode, where operation in the first mode includes the control system (i) directing the particular aerial vehicle to navigate to each of a plurality of altitudes and (ii) determining respective wind-related data at each respective altitude of the plurality of altitudes, and where operation in the second mode includes the control system (i) selecting at least one altitude based at least in part on the determined wind-related data and (ii) directing the particular aerial vehicle to reposition to the at least one selected altitude. The method further involves, based on the selection, the control system operating the particular aerial vehicle according to the first mode or operating the particular aerial vehicle according to the second mode.

In another aspect, a control system is provided. The control system includes one or more processors, a non-transitory computer readable medium, and program instructions stored on the non-transitory computer readable medium and executable by the one or more processors to determine flight data for a particular aerial vehicle in an aerial network including a plurality of aerial vehicles. The program instructions are also executable to, based at least in part on the flight data, make a selection between a first mode and a second mode, where operation in the first mode includes the one or more processors (i) directing the particular aerial vehicle to navigate to each of a plurality of altitudes and (ii) determining respective wind-related data at each respective altitude of the plurality of altitudes, and where operation in the second mode includes the one or more processors (i) selecting at least one altitude based at least in part on the determined wind-related data and (ii) directing the particular aerial vehicle to reposition to the at least one selected altitude. The program instructions are further executable to, based on the selection, operate the particular aerial vehicle according to the first mode or operate the particular aerial vehicle according to the second mode.

In yet another aspect, an aerial vehicle is provided. The aerial vehicle includes one or more processors, a non-transitory computer readable medium, and program instructions stored on the non-transitory computer readable medium and executable by the one or more processors to determine flight data for the aerial vehicle. The program instructions are also executable to, based at least in part on the flight data, make a selection between a first mode and a second mode, where operation in the first mode includes the one or more processors (i) directing the aerial vehicle to navigate to each of a plurality of altitudes and (ii) determining respective wind-related data at each respective altitude of the plurality of altitudes, and where operation in the second mode includes the one or more processors (i) selecting at least one altitude based at least in part on the determined wind-related data and (ii) directing the aerial vehicle to reposition to the at least one selected altitude. The program instructions are further executable to, based on the selection, operate the aerial vehicle according to the first mode or operate the aerial vehicle according to the second mode.

In yet another aspect, a system is provided. The system includes means for determining flight data for a particular aerial vehicle in an aerial network including a plurality of aerial vehicles. The system also includes means for, based at least in part on the flight data, making a selection between a first mode and a second mode, where operation in the first mode includes (i) directing the particular aerial vehicle to navigate to each of a plurality of altitudes and (ii) determining respective wind-related data at each respective altitude of the plurality of altitudes, and where operation in the second mode includes (i) selecting at least one altitude based at least in part on the determined wind-related data and (ii) directing the particular aerial vehicle to reposition to the at least one selected altitude. The system further includes means for, based on the selection, operating the particular aerial vehicle according to the first mode or operating the particular aerial vehicle according to the second mode.

These as well as other aspects, advantages, and alternatives, will become apparent to those of ordinary skill in the art by reading the following detailed description, with reference where appropriate to the accompanying drawings.

DETAILED DESCRIPTION

Figure 1:
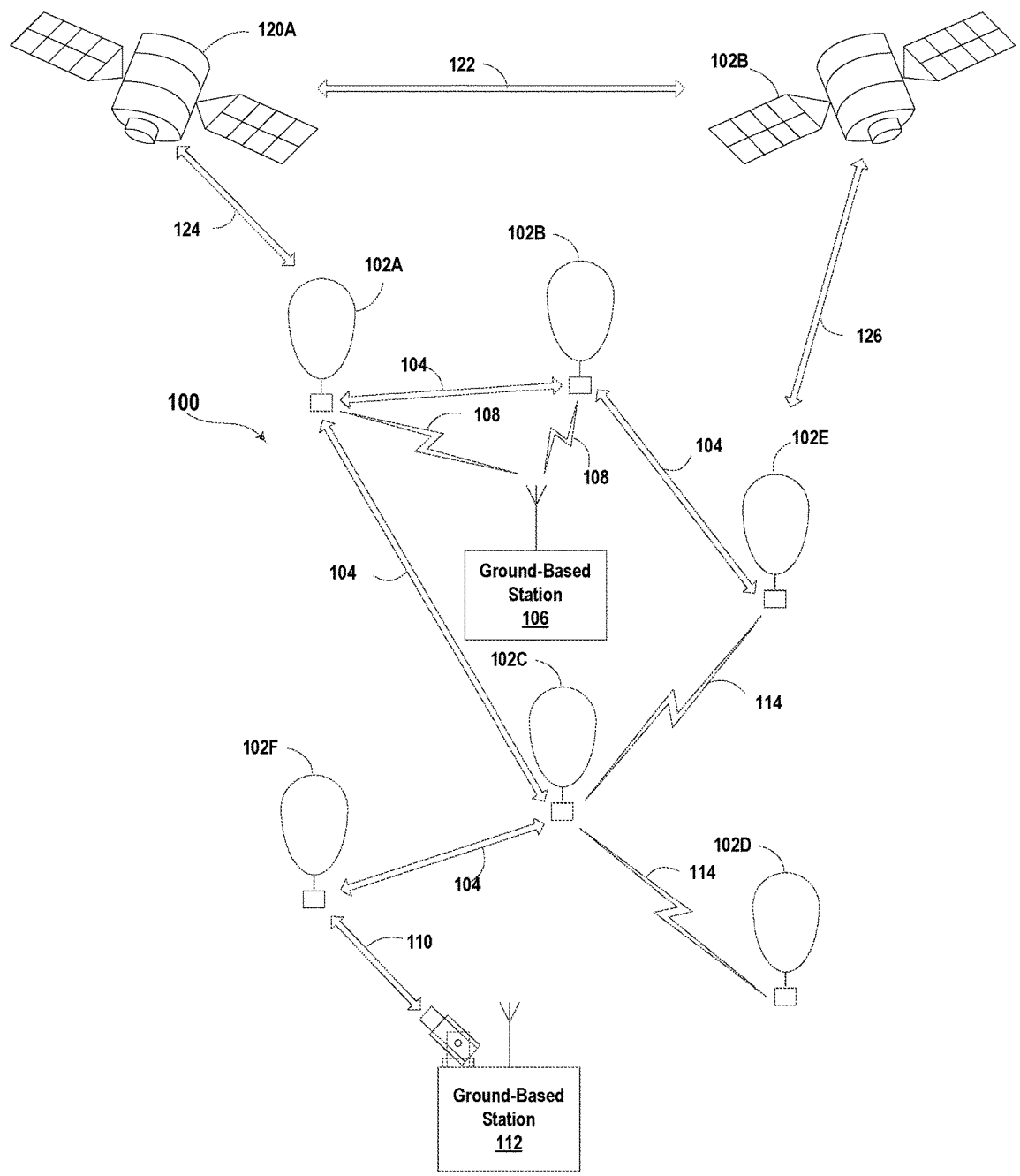
FIG. 1 is a simplified block diagram illustrating a balloon network, according to an example embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

I. OVERVIEW

Example embodiments relate to airborne networks formed by aerial vehicles; and, in particular, to balloon networks formed by high-altitude balloons. Such an airborne network may function to extend the reach of and/or fill coverage gaps in other data networks such as the Internet, and/or may serve other purposes. The aerial vehicles in the airborne network may travel horizontally over the surface of the earth, such that a given aerial vehicle can move into and out of the wireless-communication range of a ground station. In order to travel horizontally in this manner, a given aerial vehicle may engage in vertical movements within the atmosphere, and more specifically, within the stratosphere.

Wind velocities and/or wind directions vary at different altitudes within the stratosphere. Accordingly, one technique for navigating an aerial vehicle within the stratosphere involves causing the aerial vehicle to adjust its vertical position (i.e., altitude) in order to move in a desired horizontal direction. For example, taking advantage of the altitudinally-varying wind conditions in the stratosphere, the aerial vehicle may control its altitude to find winds that carry it in a desired horizontal direction (e.g., latitudinally and/or longitudinally) and perhaps at a desired velocity. Using such altitude changes to cause horizontal movement, the aerial vehicle may consume less power, on average, than using a thruster or fan to achieve the same horizontal movement. In some cases, however, the aerial vehicle may not be able to determine an altitude to fly at in order to achieve certain desired horizontal movements.

Disclosed herein are methods and systems that can help an aerial vehicle achieve desired horizontal movements. In particular, a control system may operate the aerial vehicle according to an explore mode or according to a control mode. In the explore mode, the aerial vehicle may be directed to explore the stratosphere (and/or other portions of the atmosphere) and to provide information related to wind conditions at various altitudes within the stratosphere. For instance, the control system may direct the aerial vehicle to move to a particular altitude and to provide information related to wind conditions at that particular altitude. In this way, the control system may determine how the aerial vehicle can horizontally move at that particular altitude.

Whereas, in the control mode, the aerial vehicle may be directed to specific altitudes at which the aerial vehicle could carry out various operations. While the aerial vehicle could also provide information related to wind conditions at various altitudes as the aerial vehicle is being operated according to the control mode, the purpose of the control mode may be to direct the aerial vehicle specific altitudes at which the aerial vehicle could carry out specific desired operations other than just provide the information related to wind conditions. For instance, the control system may direct the aerial vehicle to altitudes at which the aerial vehicle is to provide services to various devices. And in another instance, the control system may direct the aerial vehicle to altitudes at which the aerial vehicle can move to help achieve a certain network topology of the airborne network of aerial vehicles.

In a further aspect, an example embodiment may help to intelligently select between operation of the aerial vehicle in the explore mode and the control mode. Accordingly, disclosed herein are various considerations that can be used to make such a selection. Examples of selection criteria may include, but are not limited to: uncertainty regarding wind conditions at certain altitudes, a fixed operations schedule, movement capabilities of the aerial vehicle, resource availability of the aerial vehicle, and/or services being provided by the aerial vehicle. Once the control system evaluates one or more of these considerations and selects a mode, the control system may then operate the aerial vehicle according to the selected mode.

II. ILLUSTRATIVE BALLOON NETWORKS

In some embodiments, a high-altitude-balloon network may be homogenous. More specifically, in a homogenous high-altitude-balloon network, each balloon is configured to communicate with nearby balloons via free-space optical links and/or other types of wireless links. Further, some or all of the balloons in such a network, may also be configured communicate with ground station(s) using RF communications links and/or other types of wireless communication. For example, balloons may communicate with ground stations over LTE links and/or millimeter wave (mmW) communication links.

In other embodiments, a high-altitude-balloon network may be heterogeneous, and thus may include two or more different types of balloons. For example, some balloons may be configured as super-nodes, while other balloons may be configured as sub-nodes. (Note also that some balloons may be configured to function as both a super-node and a sub-node.) In such a configuration, the super-node balloons may be configured to communicate with nearby super-node balloons via RF links and/or free-space optical links, and to communicate with ground-based backhaul stations via optical and/or mmWave links (and possibly via RF links as well). However, the sub-node balloons may not be configured for optical or mmWave communication with ground-based backhaul stations, and may only be configured for RF air-to-ground communications (or might not be configured for air-to-ground communications at all). Further, other combinations of different types of balloons are possible in a various network configurations.

FIG. 1 is a simplified block diagram illustrating a balloon network 100, according to an exemplary embodiment. As shown, balloon network 100 includes balloons 102A to 102F, which are configured to communicate with one another via free-space optical links 104. Configured as such, balloons 102A to 102F may collectively function as a mesh network for packet-data communications. Further, balloons 102A to 102F may be configured for RF communications with ground stations 106 via RF links 108.

In an exemplary embodiment, balloons 102A to 102F are high-altitude balloons, which are deployed in the stratosphere. In an exemplary embodiment, balloons 102A to 102F may generally be configured to operate at altitudes between 17 km and 22 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 22 km may vary with latitude and by season, the variations can be modeled in a reasonably accurate manner. Additionally, altitudes above 17 km are typically above the maximum flight level designated for commercial air traffic. Therefore, interference with commercial flights is not a concern when balloons are deployed between 17 km and 22 km.

To transmit data to another balloon, a given balloon 102A to 102F may be configured to transmit an optical signal via a communication link 104. In an exemplary embodiment, a given balloon 102A to 102F may use one or more RF transmitters, receivers, and/or transceivers to communicate with other balloons. Alternatively, some or all of balloons 102A to 102F may include high-power light-emitting diodes (LEDs) and/or laser systems for communication over communication links 104. Additional details of balloons implementations are discussed in greater detail below, with reference to FIG. 3.

In a further aspect, balloons 102A to 102F may utilize one or more of various different RF air-interface protocols for communication ground stations 106 via RF links 108. For instance, some or all of balloons 102A to 102F may be configured to communicate with ground stations 106 using protocols described in IEEE 802.11 (including any of the IEEE 802.11 revisions), various cellular protocols such as GSM, CDMA, UMTS, EV-DO, WiMAX, LTE, and/or one or more propriety protocols developed for balloon-to-ground RF communication, among other possibilities.

Further, in some embodiments, balloons may use millimeter wave bands for RF communications with ground stations 106. For instance, example configurations may utilize spectrum in the 71-76, 81-86 and/or 92-95 GHz bands for high-bandwidth point-to-point communications between a balloon and a ground station (it is noted that these frequencies do require a transmitting license from the FCC). Links utilizing these bands may provide a bandwidth of 10 Gbit/sec. Further, in some configurations, a small 100 MHz range that has been reserved for space-borne radios may also be used for communications between a balloon and a ground station. Other configurations for communications between a balloon and a ground station are also possible.

Ground stations, such as ground stations 106 and/or 108, may take various forms. Generally, a ground station may include components such as transceivers, transmitters, and/or receivers for communication via RF links and/or optical links with a balloon network. Further, a ground station may use various air-interface protocols in order to communicate with a balloon 102A to 102E over an RF link 108. As such, a ground station 106 may be configured as an access points via which various devices can connect to balloon network 100. Ground stations 106 may have other configurations and/or serve other purposes without departing from the scope of the invention.

In further aspect, in order to provide Internet and/or other types of wireless data service in remote locations, balloon network 100 may function as a backhaul network. Configured as such, balloon network 100 may extend the reach of and/or fill coverage gaps in other data networks such as the Internet. Accordingly, some ground stations 106 may function as gateways or switches, which allow for communications from other data networks to be routed to and from the balloon network 100.

Further, terrestrial access networks may be implemented to provide terrestrial client devices with access to balloon network 100. For example, wireless and/or wired access points (not shown) may be installed in various locations throughout a given geographic area. The terrestrial access points in a given geographic area may all be communicatively coupled to a ground station 106, which operates as a switch or gateway for the access points in the geographic area. When configured as a switch, a ground station 106 may establish a backhaul link to the balloon network 100, such that communications from access points and/or other data networks can be routed through the balloon network 100.

In a further aspect, a balloon network 100 may optionally be operable for communications with a satellite network, which can include any number of space-based satellites 120A and 120B. The satellites can be of any suitable type. Examples of suitable types of satellites include communications satellites, navigational satellites, Earth observation satellites, weather satellites, or a combination or a variation of such satellites. In FIG. 1, the satellite network 520 is shown to include two satellites, namely satellites 120A and 120B, for ease of explanation.

Generally, the satellites 120A and 120B may be configured for relatively long-range communication with each other, with high-altitude balloons 102A to 102F, and with ground stations. In particular, the satellite 120A may be operable to communicate with the satellite 120B by way of the communication link 122, and with the balloon 102A by way of the communication link 124. Similarly, the satellite 120B may be operable to communicate with the satellite 120A by way of the communication link 122 and with the balloon 102E by way of the communication link 126. Note that a given balloon may move over time to a location where it no longer has a line-of-sight to a satellite that the balloon was previously able to communicate with. Thus, as balloons and satellites move over the surface of the earth, a given balloon may tear down and establish communication links with different satellites. In a further aspect, satellites 120A and 120B may be operable communicate with ground stations, such as the ground station 106 or ground station 112, by way of communication links, although the communication links are omitted from FIG. 1 to simplify the illustration.

The satellites 120A and 120B can use any suitable communication protocol and frequency range for communicating with one another. For example, the satellites 120A and 120B can communicate with one another in the radio frequency range. As another example, the satellites 120A and 120B can communicate with the use of lasers. These examples are illustrative only; the satellites 120A and 120B can communicate in any way that is currently known in the art or is yet to be known in the art.

In addition, the satellites 120A and 120B can use any suitable communication protocol and frequency range to communicate with high-altitude balloons (and other aerial vehicles), and/or with ground stations. For example, the satellites 120A and 120B can communicate with the balloons and ground stations in a suitable microwave range. An example of a suitable microwave range is the IEEE E-Band, which includes 70-90 GHz. Other suitable microwave ranges may include the IEEE C-band, which corresponds to a frequency range of 4-8 GHz, and/or the IEEE $K_u$ band, which corresponds to a frequency range of 12-18 GHz. Other examples are also possible.

In a further aspect, a flight-data publishing system (not shown in FIG. 2) may gather flight (e.g., telemetry) data from the balloons 102A to 102F in a balloon network, and make the flight data available to other systems. For example, balloons 102A to 102F may send flight data to a ground-based flight-data publishing system via a satellite network. For example, a given balloon may periodically send its current flight data to a satellite 120A, which may then route the flight data to a ground-based flight-data publishing system. Further, the flight data reported by a given balloon may include location, trajectory, velocity, measured wind conditions, air temperature, atmospheric pressure, and/or operational status of various balloon systems, among other possibilities.

A. Mesh-Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data direct to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

Further, in order to operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an exemplary balloon network 100 may apply a mesh protocol to update the state of the network as the topology of the network changes. For example, to address the mobility of the balloons 102A to 102E, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102E may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for improving QoS may be employed when determining a lightpath. Other techniques are also possible.

B. Dynamic Topology of Balloon Network

In an exemplary embodiment, the topology of an exemplary balloon network may be dynamic and adaptable. In particular, example balloons 102A to 102F may move with winds in the stratosphere. As such, movement in different directions may be achieved by increasing or decreasing a balloon's altitude, such that the balloon is at an altitude with a desired wind direction and/or velocity. For example, one or more balloons could move to new positions to increase or decrease the density of balloons in a given area. In such a configuration, balloons may be in continuous or nearly continuous motion, and the movement of balloons may be controlled or influenced according to various constraints, such as a desired network topology and/or desired coverage of the balloon network.

For example, movements of balloons 102A to 102F may be coordinated in order to maintain and/or move balloons into a certain positions relative to one or more other balloons in the network (and possibly in a certain position relative to the ground). Additionally or alternatively, movements of balloons 102A to 102F may be coordinated in order to meet certain coverage requirements or goals in various geographic areas.

The desired topology of a balloon network may vary depending upon the particular implementation. In some cases, balloons may be controlled in an effort to provide a substantially uniform topology. In such case, balloons 102A to 102F (or a control system for the balloons) may implement functions to position the balloons at substantially the same distance (or within a certain range of distances) from adjacent balloons in the balloon network 100. Note that because balloons may be in nearly continuous motion (e.g., being moved by winds in the stratosphere), balloons may maintain a uniform topology while collectively moving over the earth. In such embodiments, the movement of balloons may be such that balloon(s) move into a particular geographic area as other balloon(s) move out of the particular geographic area, in an effort to provide continuous coverage from the balloon network in the particular geographic area.

In other cases, a balloon network 100 may have a non-uniform topology. For instance, exemplary embodiments may involve topologies where balloons area distributed more or less densely in certain areas, for various reasons. Note that in such embodiments, there may be substantially uniform topologies of different densities in different sub-areas within the larger coverage area of the balloon network. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

C. Control of Balloons in a Balloon Network

Figure 2:
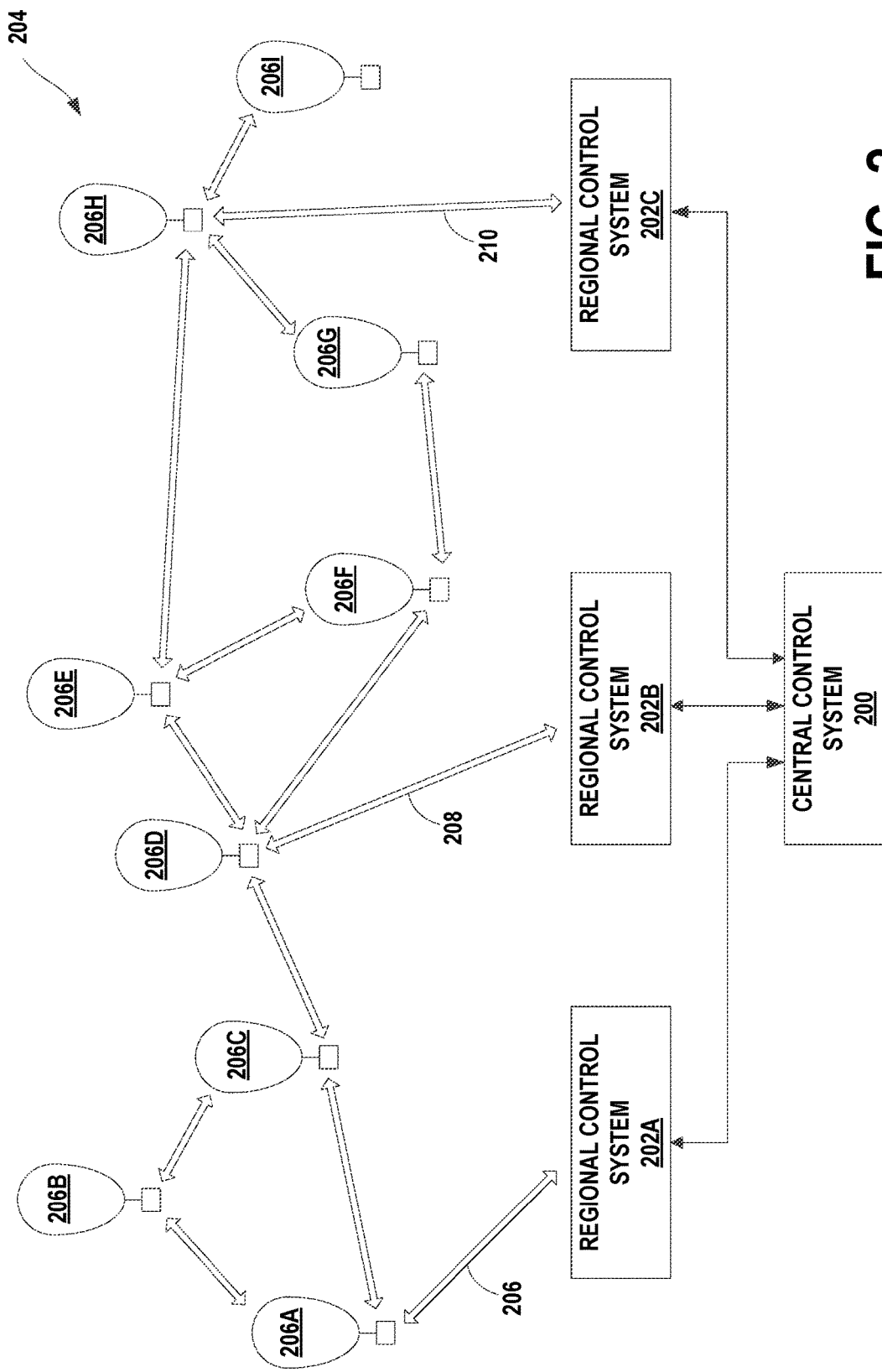
FIG. 2 is a block diagram illustrating a balloon-network control system, according to an example embodiment.

In some embodiments, control of the balloons in a balloon network may be centralized. For example, FIG. 2 is a block diagram illustrating a balloon-network control system, according to an exemplary embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, some or all balloons may be configured as to communicate with regional control systems 202A to 202C. Accordingly, each regional control system 202A to 202C may be configured to communicate with a balloon or balloons that are currently operating over its respective geographic area. For example, in the illustrated embodiment, balloons 204A, 204D, and 204H may communicate with regional control systems 202A to 202C, respectively, via optical links 206, 208, and 210, respectively.

Note that a regional control system 202A to 202B may in fact just be particular type of ground station that is configured to communicate with balloons (e.g., such as ground station 112 of FIG. 1). Thus, while not shown in FIG. 2, the control system shown in FIG. 2 may be implemented in conjunction with other types of ground stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate movements (e.g., flights) of balloons in balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other balloon control functions as well.

In an exemplary embodiment, a backhaul matching system may be implemented as part of a central control system 200. The backhaul matching system may utilize ground station information and flight data for the balloon network 204 to coordinate backhaul communications between ground stations and balloon network 204. To do so, the backhaul matching system may assign certain balloon flights to certain ground stations for backhaul communications, and may update these flight assignments as the topology of the balloon network changes over time. To facilitate this functionality, central control system 200 may also include a centralized database of flight data for the balloon network, and/or a centralized database of ground station information.

As noted, FIG. 2 shows a distributed-control arrangement, with regional control systems 202A to 202C coordinating communications between a central control system 200 and a balloon network 204. Such an arrangement may be useful in a balloon network that covers a large geographic area. In some embodiments, a distributed control system may even support a global balloon network that provides coverage everywhere on earth. Of course, a distributed-control arrangement may be useful in other scenarios as well.

Further, it should be understood that other control-system arrangements are possible. For instance, some implementations may involve a distributed control system with additional layers (e.g., sub-region systems within the regional control systems, and so on). Alternatively, control functions may be provided by a single, centralized, control system, which communicates directly with one or more downlink balloons. Moreover, control and coordination of a balloon network may be shared between a ground-based control system and a balloon network to varying degrees, depending upon the implementation.

D. Illustrative Balloon Configurations

Figure 3:
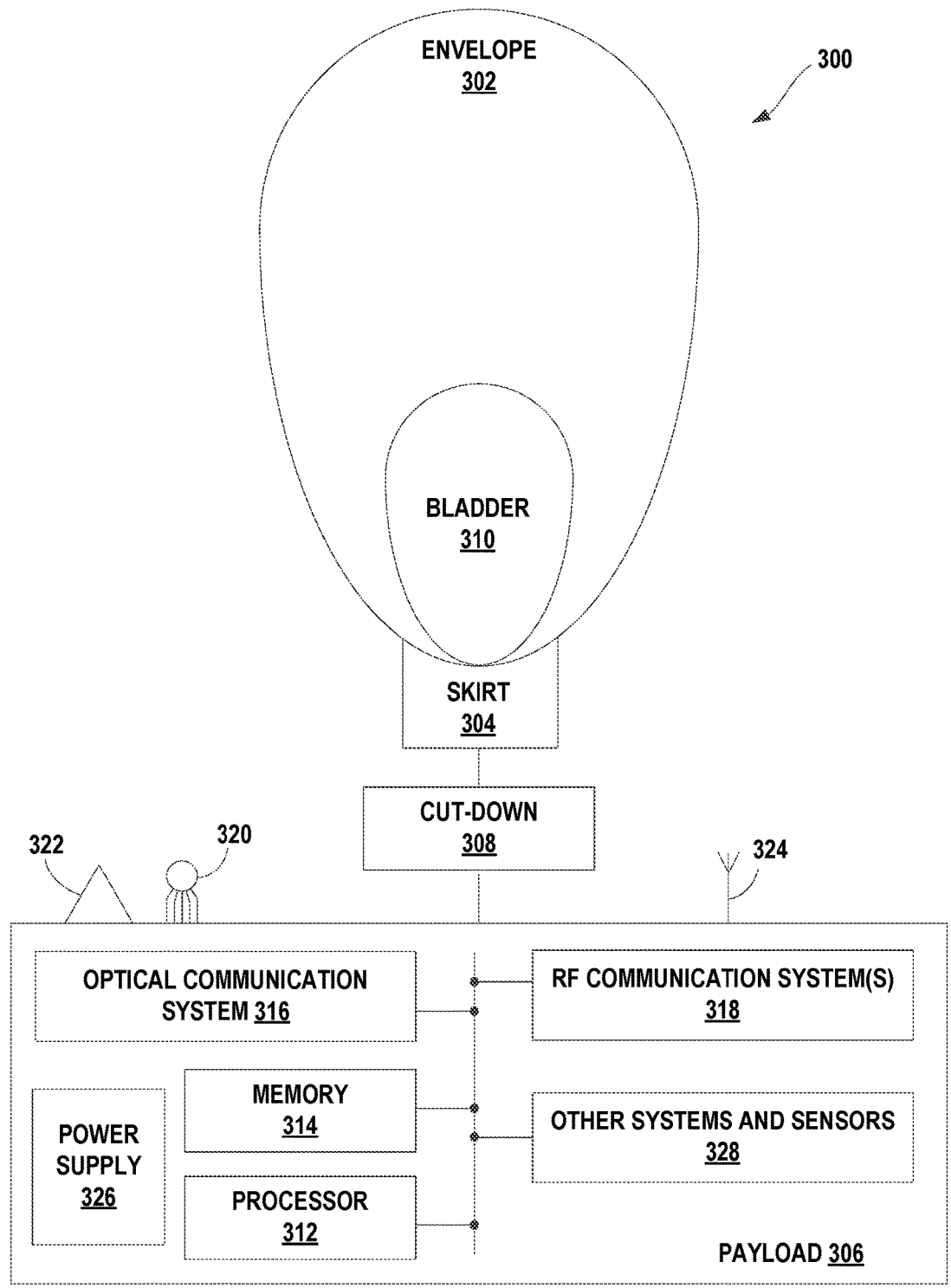
FIG. 3 is a simplified block diagram illustrating a high-altitude balloon, according to an example embodiment.

Various types of balloon systems may be incorporated in an exemplary balloon network. As noted above, an exemplary embodiment may utilize high-altitude balloons, which typically operate in an altitude range between 17 km and 22 km. FIG. 3 is a simplified block diagram illustrating a high-altitude balloon 300, according to an exemplary embodiment. As shown, the balloon 300 includes an envelope 302, a skirt 304, a payload 306, and a cut-down system 308 that is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photo-diode receiver system). Further, payload 306 may include an RF communication system(s) 318, which may transmit and/or receive RF communications via an antenna system 324. RF communication system(s) 318 may additionally or alternatively include an RF communication system for communications with ground stations, such as a wireless chipset and antenna for LTE and/or millimeter wave (mmW) communications, among other possibilities. The payload 306 may also include a power supply 326 to supply power to the various components of balloon 300.

Further, payload 306 may include various types of other systems and sensors 328. For example, payload 306 may include, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind velocity and/or direction, among other information.

As noted, balloon 306 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow air to escape from bladder 310.

Further, the balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground.

Note that movement and locations of balloons, such as balloon 300, can vary since winds in the stratosphere may affect the locations of the balloons in a differential manner. A balloon in an example network may be configured to change its horizontal position by adjusting its vertical position (i.e., altitude). For example, by adjusting its altitude, a balloon may be able to find winds that will carry the balloon horizontally (e.g., latitudinally and/or longitudinally) to a desired horizontal location. Wind velocity and/or direction may vary with altitude, and since current wind velocities as well as weather forecasts are available, in principle, a balloon may be directed to a location by identifying an altitude at which a wind direction takes a balloon to along a desired trajectory. However, a balloon without other forms of propulsion may be constrained to follow the wind and there may not be a single altitude with winds taking the balloon along the desired trajectory. In addition, to control a fleet of balloons, movement of the balloons should occur from one location above the surface of the Earth to another in a predictable manner.

III. EXAMPLE EXPLORE AND CONTROL MODES

Example implementations relate to a control system that may operate an aerial vehicle according to an explore mode or according to a control mode. This aerial vehicle may be one of the balloons discussed above in association with FIGS. 1 to 3 or could be any other entity capable of flying at various altitudes. Also, the control system at issue may be a central control system (e.g., central control system 200), a regional control system (e.g., regional control system 202A), may be incorporated as part of a ground-based station and/or may be incorporated as part of an aerial vehicle, among other possibilities. And when the control system is incorporated as part of an aerial vehicle, this aerial vehicle may itself be the aerial vehicle being operated according to the above-mentioned modes and/or the aerial vehicle may be another aerial vehicle in the aerial network, among other options.

Regardless of the arrangement in which the control system is found, the control system may generally include one or more processors and data storage (e.g., a non-transitory computer readable medium). Also, the control system may include program instructions that are stored on the data storage and are executable by one or more of the processors to carry out various operations, such as those discussed herein. Moreover, the control system may take various forms. For instance, the control system may take the form of a chip set, a server system, a digital signal processor, a programmable logic controller, and/or a sampled-data system, among other possibilities.

With these arrangements, the control system may operate a particular aerial vehicle by transmitting one or more commands to the particular aerial vehicle. These commands may be transmitted by way of communication links, such as those described above for instance. Also, these commands may be based on the mode in which the particular aerial vehicle is being operated. In this manner, the control system may operate the particular aerial vehicle according to the explore mode or according to the control mode. These explore and control modes are described in more detail below.

A. Example Explore Mode

When the control system operates the particular aerial vehicle in accordance with the explore mode, the particular aerial vehicle may navigate to each of a number of different altitudes within the stratosphere; or in other words, may explore or test actual wind conditions at different altitudes. To determine these wind conditions at different altitudes the control system may receive various types of data from sensors of the particular aerial vehicle (e.g., sensors 328 of balloon 300), such as data related to altitude, wind velocity, and/or wind direction at different altitude for instance. Also, the control system may receive this data at various times, such as periodically, upon request, and/or at each instance that the particular aerial vehicle arrives at a different altitude or at a different altitude range, among other possibilities. Once the control system receives the data, the control system may then store the data on data storage of the control system and/or on external data storage that is accessible to the control system.

Furthermore, the control system may select the particular altitudes that are explored and may do so in various ways. For example, the particular altitudes that are explored may be those for which the control system needs additional information, such as additional information regarding wind conditions. In another example, the particular altitudes that are explored may be selected by a user of the system by way of user-input data provided to the control system, such via a graphical user interface (GUI) on a computing device in communication with the control system for instance. In yet another example, the control system may randomly select the various altitudes. Other examples are possible as well.

As the aerial vehicle flies to different altitudes, the control system may determine wind-related data respectively at each of a plurality of altitudes and may use the determined wind-related data as basis for determining movement capabilities of the aerial vehicle respectively at each such altitude of the plurality of altitudes. For instance, the control system may determine respective wind direction at a particular altitude. And based on this determined wind direction, the control system may determine a respective direction of travel for the particular aerial vehicle at that particular altitude. Additionally or alternatively, the control system may determine respective wind velocity at a particular altitude. And based on this determined wind velocity, the control system may determine a respective velocity of travel for the particular aerial vehicle at that particular altitude. In some cases, the control system could just receive movement information, such as the velocity of travel and/or the direction of travel.

Given this wind-related data (and/or received movement information), the control system may also determine stratospheric boundaries within the stratosphere. In particular, the stratosphere can include a number of atmospheric layers, which may be 1-3 kilometers thick, for instance. The wind velocity will typically change slowly as an aerial vehicle traverses vertically through a layer of the stratosphere.

However, at boundaries between layers, there may be abrupt changes in wind velocity. By way of example, a 100 meter altitude change that moves an aerial vehicle across a layer boundary may result in an order of magnitude greater wind velocity change than the aerial vehicle would have accomplished by traversing through the interior of an entire layer. As such, these abrupt changes in wind velocity may significantly affect the movement capabilities of the particular aerial vehicle and thus such boundaries may be determined by the control system based on the wind-related data.

In this manner, the explore mode allows the control system to essentially construct a map relating movement capabilities of the particular aerial vehicle to various altitudes within the atmosphere. Using at least the information obtained in the explore mode, the control system can then operate the particular aerial vehicle according to the control mode as further discussed below. Moreover, this determined information may also be shared with or otherwise applied to other aerial vehicles, so as to allow for appropriate control of such other aerial vehicles as well.

FIGS. 4A to 4D illustrate a control system 402 operating a balloon 404 according to the explore mode. As shown, the control system 402 communicates with the balloon 404 by way of a communication link 406 (e.g., directly or via one or more other entities). Also, the control system 402 has stored in data storage or otherwise has access to mapping data 408 that maps each of various altitudes to a respective wind directions and respective wind velocities. While the wind directions are characterized in terms of cardinal directions (e.g., north), the wind directions could also be characterized in other ways, such as by using azimuth degrees for instance. Moreover, while the wind velocities are characterized in terms of meters per second (m/s), the wind velocities could also be characterized in other ways, such as by using other units (e.g., miles per hour (mph)) for instance.

Figure 4A:
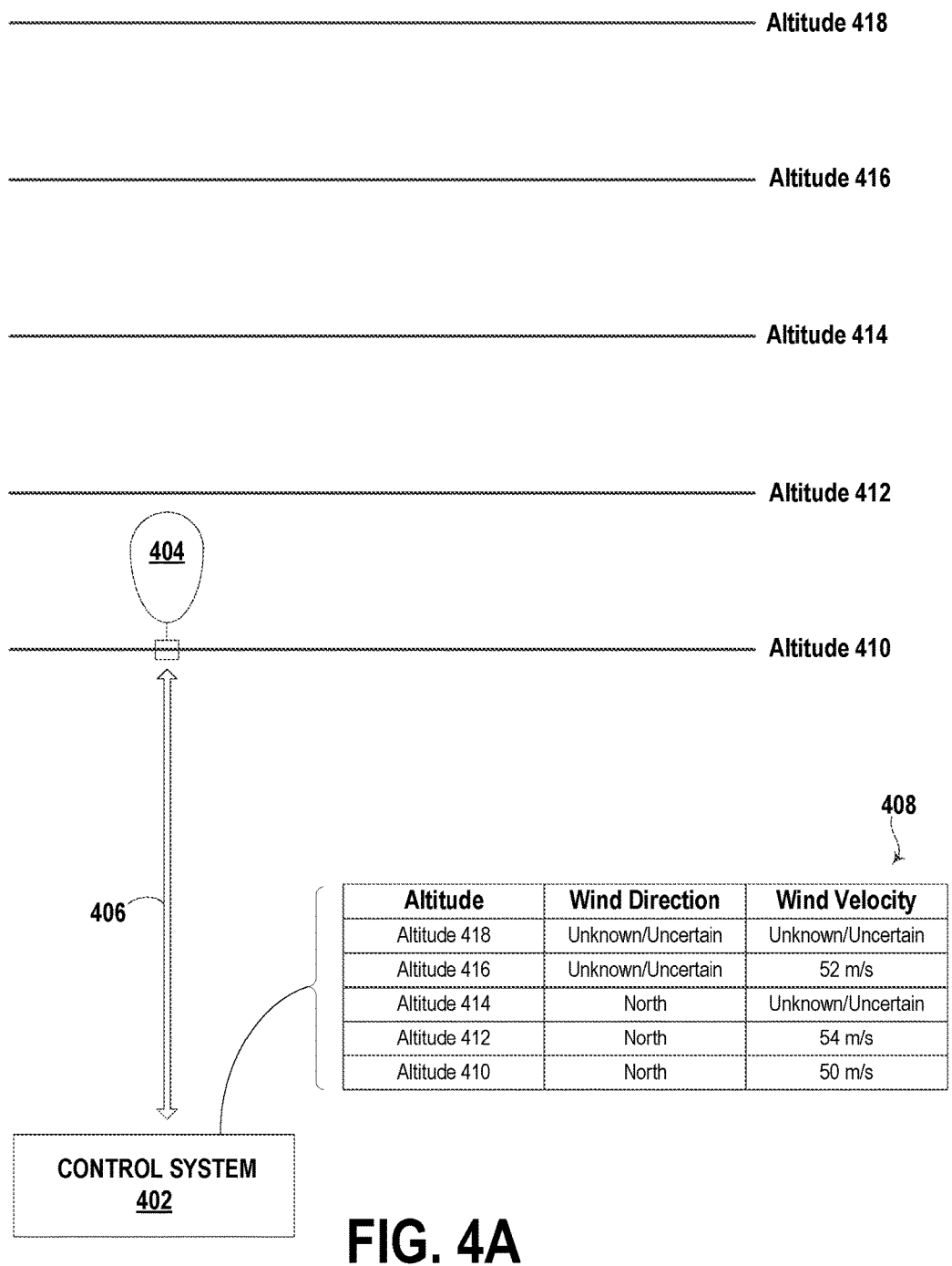
FIGS. 4A to 4D illustrate a control system operating a balloon according to an explore mode, according to an example embodiment.

FIG. 4A illustrates the balloon 404 as flying at an altitude 410 having a corresponding northerly wind direction and a corresponding wind velocity of 50 m/s. While the balloon 404 flies at altitude 410, the control system 402 may not know (e.g., may not have data stored thereon) and/or may be uncertain (e.g., have high levels of uncertainty as further discussed below) of wind directions and/or wind velocities at some altitudes. For instance, the control system 402 may be uncertain of wind velocity at altitude 414, may be uncertain of wind direction at altitude 416, and may be uncertain of both wind direction and wind velocity at altitude 418. As such, the control system 402 may operate the balloon 404 in accordance with the explore mode, so as to obtain the additional information at these various altitudes.

Figure 4B:
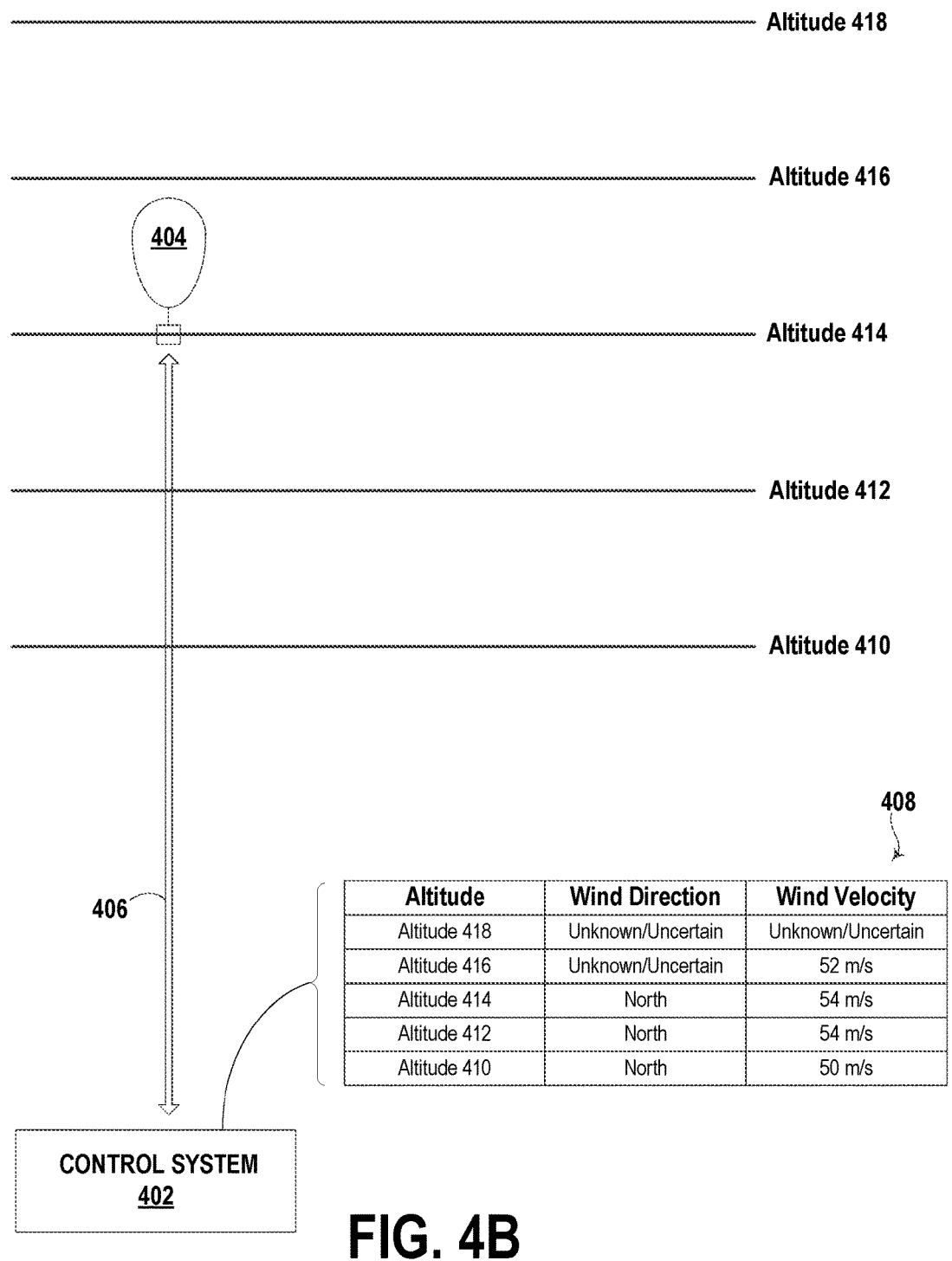

For example, the control system 402 may direct the balloon 404 to move from altitude 410 to altitude 414. And as shown in FIG. 4B, the balloon 404 has moved to altitude 414. While the balloon is at altitude 414, the control system 402 may receive from the balloon 404 data related to wind velocity at altitude 414. Once this data is received, the control system 402 may determine that the wind velocity at altitude 414 is 54 m/s and the control system 402 may record the determined wind velocity in the mapping data 408 as shown in FIG. 4B.

Figure 4C:
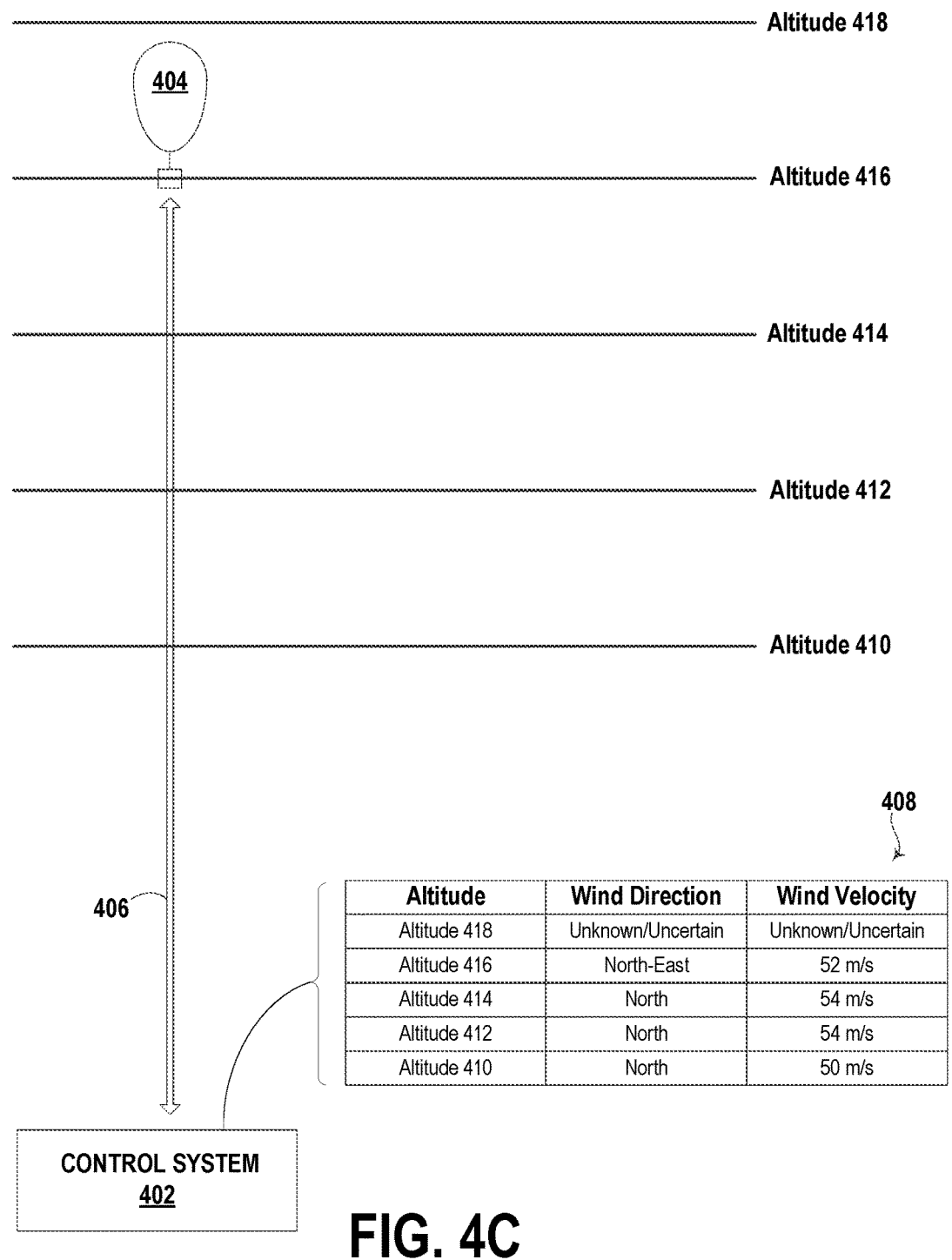

Further, the control system 402 may then direct the balloon 404 to move from altitude 414 to altitude 416. And as shown in FIG. 4C, the balloon 404 has moved to altitude 416. While the balloon is at altitude 416, the control system 402 may receive from the balloon 404 data related to wind direction at altitude 416. Once this data is received, the control system 402 may determine that the wind direction at altitude 416 is a north-eastern wind direction and the control system 402 may record the determined wind direction in the mapping data 408 as shown in FIG. 4C.

Figure 4D:
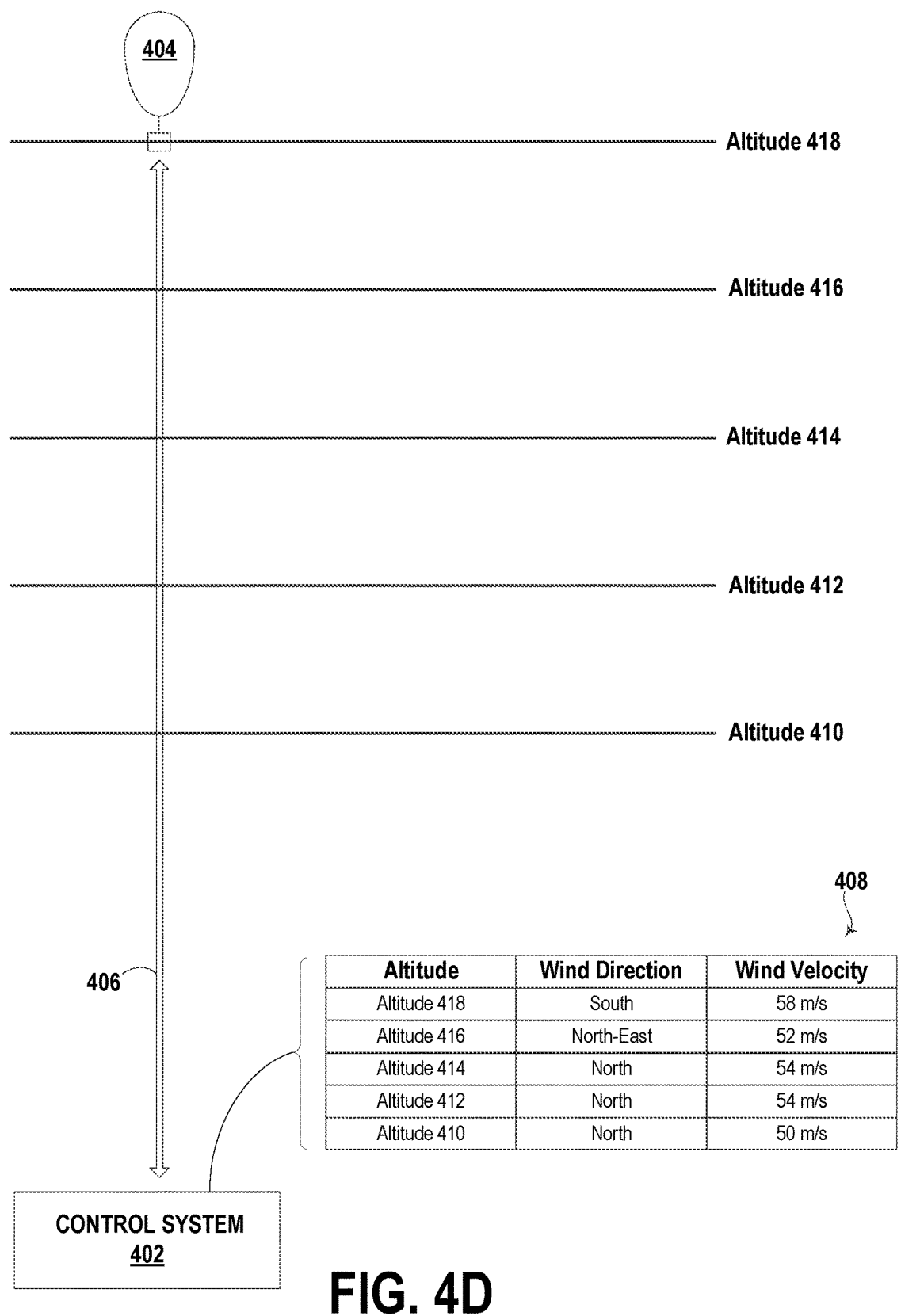

Yet further, the control system 402 may then direct the balloon 404 to move from altitude 416 to altitude 418. And as shown in FIG. 4D, the balloon 404 has moved to altitude 418. While the balloon is at altitude 418, the control system 402 may receive from the balloon 404 data related to wind direction at altitude 418 as well as data related to wind velocity at altitude 418. Once this data is received, the control system 402 may determine that the wind direction at altitude 418 is a southern wind direction. Also, control system 402 may determine that the wind velocity at altitude 418 is 58 m/s. The control system 402 may then record the determined wind direction and the determined wind velocity in the mapping data 408 as shown in FIG. 4D. Moreover, based on the wind direction at altitude 416 being a north-eastern wind direction and the wind direction at altitude 418 being a southern wind direction, the control system 402 may determine that these wind directions are substantially different relative to one another (e.g., substantially opposite) and that therefore a boundary is present between altitudes 416 and 418. Other examples and illustrations are possible as well.

B. Example Control Mode

When the control system operates the particular aerial vehicle in accordance with the control mode, the control system may specifically select at least one altitude (e.g., a single altitude, a set of altitudes, a range of altitudes, or a sequence of altitudes etc.) for the particular aerial vehicle to fly at. In doing so, the control system may select the at least one altitude so as to move the particular aerial vehicle to a desired location (e.g., within a desired network topology) and/or so as to achieve certain desired movements of the particular aerial vehicle (e.g., while providing dynamic coverage), among other possibilities.

When selecting the at least one altitude, the control system may select at least one altitude based on determined respective movement capabilities of the particular aerial vehicle at various altitudes. For instance, the control system may use data obtained during the explore mode as a basis for selecting an altitude for the particular aerial vehicle to fly at. In some cases, however, the control system may also consider other factors and/or data when selecting the altitude. For instance, the control system could also obtain wind-related data as the control system operates the particular aerial vehicle during control mode (e.g., as the particular aerial vehicle moves through various altitudes), and the control system may additionally or alternatively use this data as a basis for selecting an altitude for the particular aerial vehicle to fly at. As such, the selected altitude may be one or more of the plurality of altitudes evaluated during the explore mode and/or may be one or more other altitudes for which the control system has sufficient information, among others. And once the at least one altitude has been selected, the control system may then direct the particular aerial vehicle to reposition to the at least one selected altitude.

Within this control mode, the at least one altitude may be selected based on various considerations. For example, the particular aerial vehicle may have a certain desired direction of travel and/or a desired velocity of travel, so as to reach a target location within a certain time period and then provide coverage at the target location for instance. In this example, the particular aerial vehicle may itself determine the desired direction of travel and/or the desired velocity of travel and may then request the control system to guide the particular aerial vehicle towards achieving the desired direction of travel and/or the desired velocity of travel. Additionally or alternatively, the control system may determine the desired direction of travel and/or the desired velocity of travel and may then guide the particular aerial vehicle towards achieving the desired direction of travel and/or the desired velocity of travel. In either case, the control system may select at least one altitude for which there are corresponding movement capabilities of the particular aerial vehicle that would allow the particular aerial vehicle to achieve the desired direction of travel and/or the desired velocity of travel.

In another example, the control system may be arranged to select an altitude range having a constant/smooth change in wind velocity (and/or wind direction) with respect to the altitudes within this range. In particular, the control system may consider the above-mentioned stratospheric boundaries when selecting an altitude range. For instance, the control system may select an altitude range that is positioned between such boundaries, so as to allow for smooth control of the particular aerial vehicle throughout the altitude range rather than having the particular aerial vehicle experience abrupt changes in movement. And once the particular aerial vehicle is within this altitude range, a proportional-integral-derivative (PID) controller may be applied to control movement of the particular aerial vehicle within this altitude range. And when applying a PID controller, the PID controller may arranged so that the altitude is the analog input, the output is velocity (and/or direction), and the transfer function is the change of velocity (and/or direction) with respect to altitude within the region. Note, however, that the control system could still operate the particular aerial vehicle to move across such boundaries when the control system selects altitudes to cause the particular aerial vehicle to do so.

In yet another example, the control system may be arranged to select the at least one altitude based on consideration of predicted trajectories to arrive at a target location. In particular, the control system may use information obtained during the explore and/or control modes and/or perhaps information from predictive weather models (e.g., received from the Global Forecast System (GFS) provided by the National Oceanic and Atmospheric Administration (NOAA)) to generate predicted trajectories of the particular aerial vehicle. These predicted trajectories may specifically involve navigation of the particular aerial vehicle through a starting altitude and perhaps several subsequent altitudes (and perhaps also longitudinal and/or latitudinal navigation through one or more of the altitudes). In this example, the control system may select one of the predicted trajectories based on considerations such as the shortest arrival time at the target location, among others. As such, the control system may select altitudes that correspond to the selected trajectory. Other examples are possible as well.

Figure 5A:
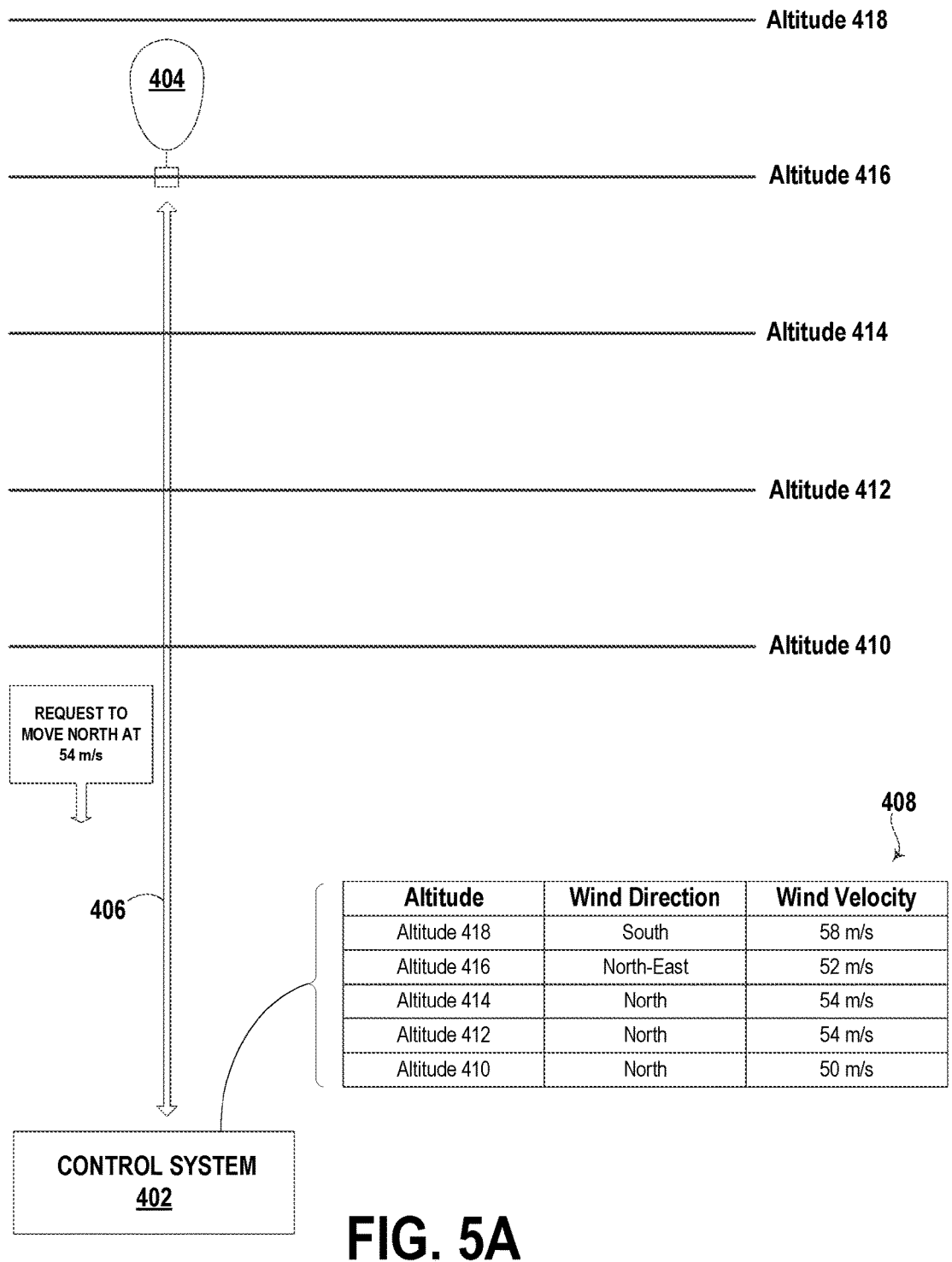
FIGS. 5A to 5C illustrate a control system operating a balloon according to a control mode, according to an example embodiment.
Figure 5B:
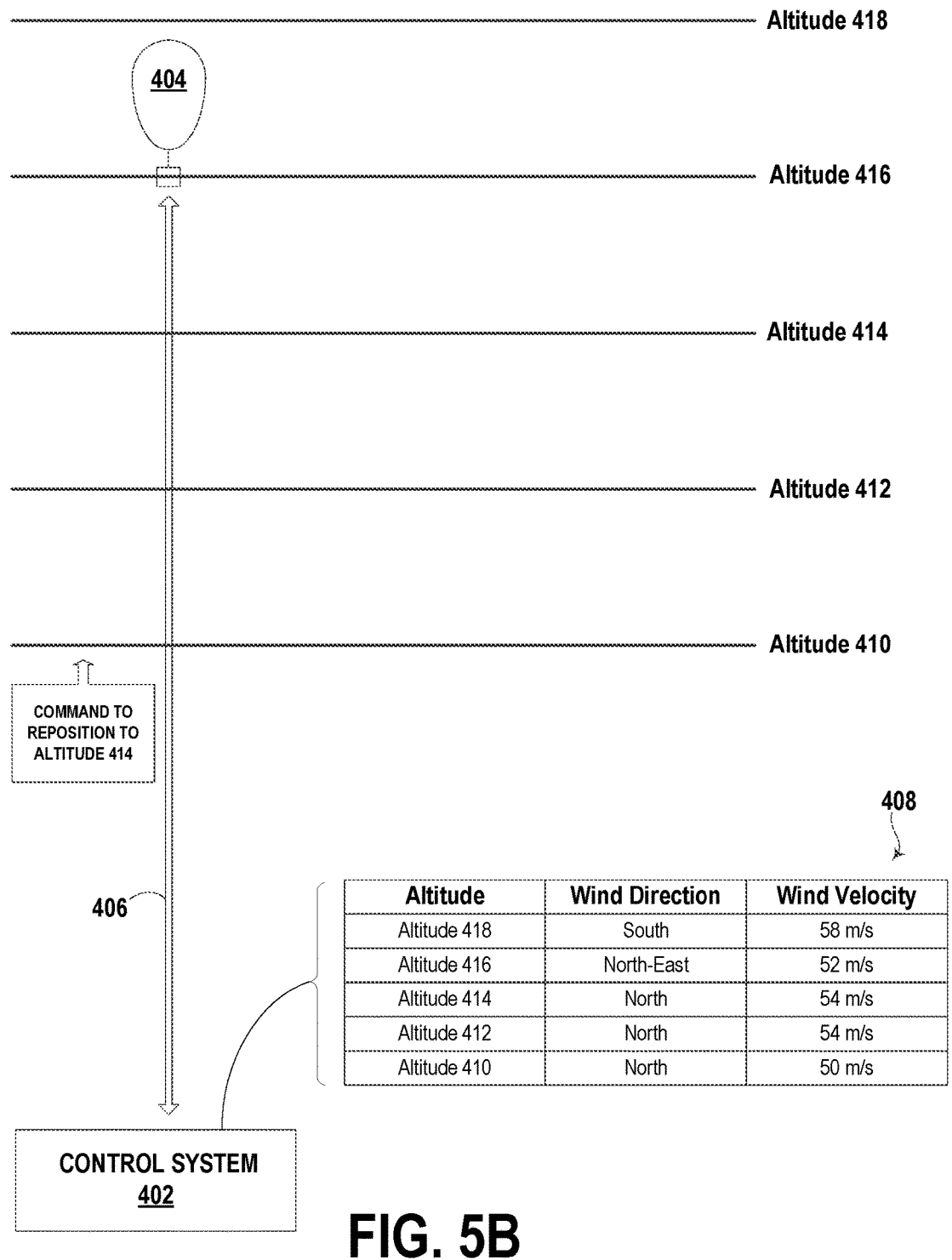
Figure 5C:
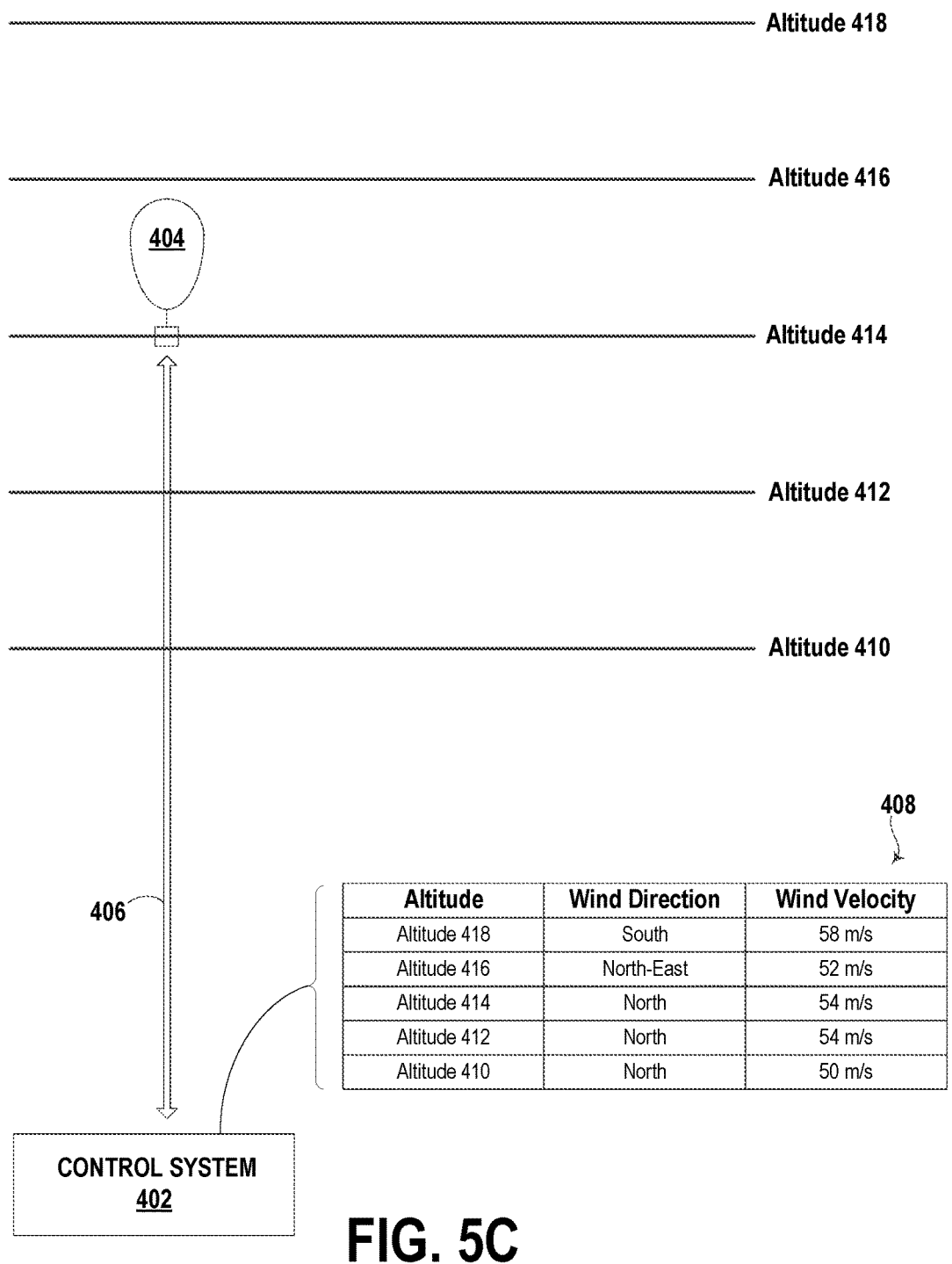

FIGS. 5A to 5C illustrate the control system 402 operating the balloon 404 according to the control mode. As shown in FIG. 5A, the balloon 404 is flying at an altitude 416 having a corresponding north-eastern wind direction and a corresponding wind velocity of 52 m/s. While the balloon 404 flies at altitude 416, the control system 402 may receive a request from the balloon 404 to move in a northern direction at 54 m/s. In other examples, the control system 402 may itself determine that the balloon 404 should move in a northern direction at 54 m/s.

Regardless, the control system 402 may responsively transmit a command to the balloon 404 as shown in FIG. 5B. This command may indicate that the balloon 404 should move to altitude 414 having a corresponding northern wind direction and a corresponding wind velocity of 54 m/s, thereby using information regarding altitude 414 that was obtained during the explore mode as discussed above in association with FIG. 4A to 4D. And as shown in FIG. 5C, once the balloon 404 receives the command, the balloon 404 may responsively move to altitude 414 at which the balloon 404 could then fly at 54 m/s in a northern direction. Other examples and illustrations are possible as well.

IV. EXAMPLE SELECTION BETWEEN EXPLORE AND CONTROL MODES

Figure 6:
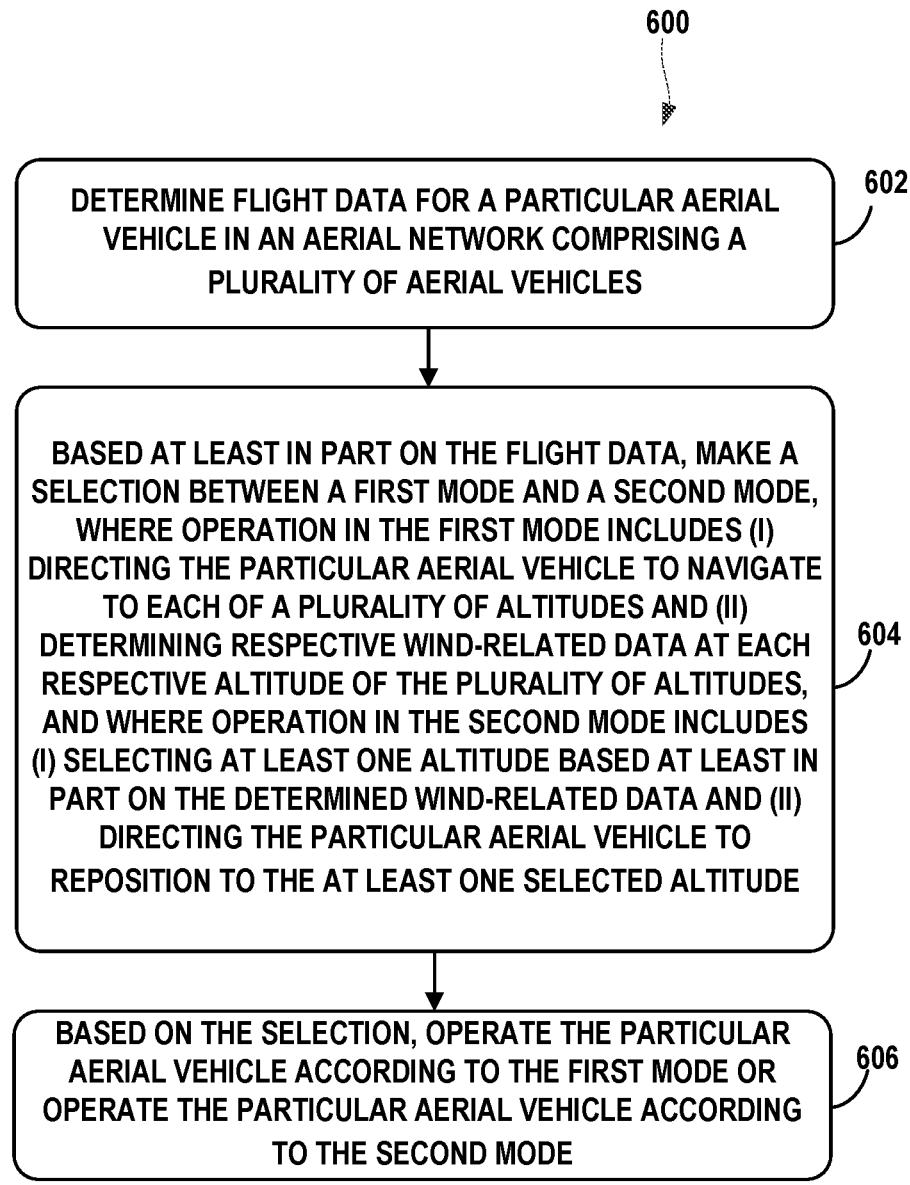
FIG. 6 is flowchart illustrating a method for selection between first and second modes, according to an example embodiment.

FIG. 6 is a flowchart illustrating a method 600, according to an example implementation. In particular, method 600 may be implemented to select between operating a particular aerial vehicle according to the explore mode and operating the particular aerial vehicle according to the control mode.

Method 600 shown in FIG. 6 (and other processes and methods disclosed herein) presents a method that can be implemented within an arrangement involving, for example, the balloon network 100, the balloon network 204, and/or the balloon 300 (or more particularly by one or more components or subsystems thereof, such as by a processor and a non-transitory computer-readable medium having instructions that are executable to cause the device to perform functions described herein). Additionally or alternatively, method 600 may be implemented within any other arrangements and systems.

A. Determining Flight Data

At block 602, method 600 involves determining flight data for a particular aerial vehicle (e.g., balloon 102A) in an aerial network (e.g., balloon network 100) comprising a plurality of aerial vehicles (e.g., balloons 102A to 102F).

In an example implementation, the control system may determine flight data associated with the particular aerial vehicle. The flight data may take various forms and may include various types of data and determinations that may be used as factors during selection between a first and a second mode, as further discussed below. In particular, the control system may determine the flight data by receiving information about the particular aerial vehicle's movements and/or information about the environment in which the particular aerial vehicle is positioned.

In some examples, flight data for the particular aerial vehicle may include information about the particular aerial vehicle's direction of travel, velocity of travel, current horizontal position (e.g., longitudinal and/or latitudinal positions), current altitude, location, trajectory, measured wind conditions, air temperature, atmospheric pressure, and/or operational status, among other possibilities. In further examples, the flight data may include information related to historical/current/predicted weather data in the environment of the particular aerial vehicle, among others. Other examples of flight data are discussed below in association with block 604.

Further, the control system may determine the flight data in various ways. In one example, the control system may receive the flight data from the particular aerial vehicle (e.g., from sensors on the particular aerial vehicle). In another example, the control system may receive the flight data from one or more aerial vehicles other than the particular aerial vehicle. In yet another example, the control system may obtain flight data from data storage of the control system. In yet another example, the control system may obtain flight data from external data storage. In yet another example, the control system may receive flight data from a cloud-based system. In yet another example, the control system may receive flight data from other entities or sources of data. For instance, the control system may receive weather data in the environment of the particular aerial vehicle and may receive this data from the GFS provided by NOAA. Other examples are possible as well.

Yet further, when the control system determines the flight data, the control system may do so at various times. In one example, the control system may determine the flight data periodically. In another example, the control system may determine the flight data based on a specific schedule. In yet another example, the control system may determine the flight data upon request. In yet another example, the control system may determine the flight data when one or more other entities choose to transmit flight data to the control system, such as at time when flight data changes for instance. Moreover, the control system could determine the flight data while the control system operates the particular aerial vehicle in accordance with an explore mode, while the control system operates the particular aerial vehicle in accordance with a control mode, and/or while the control system operate other aerial vehicles, among other possibilities. Other examples are possible as well.

B. Making a Selection Between the Modes

At block 604, method 600 involves, based at least in part on the flight data, making a selection between a first mode and a second mode, where operation in the first mode includes (i) directing the particular aerial vehicle to navigate to each of a plurality of altitudes and (ii) determining respective wind-related data at each respective altitude of the plurality of altitudes, and where operation in the second mode includes (i) selecting at least one altitude based at least in part on the determined wind-related data and (ii) directing the particular aerial vehicle to reposition to the at least one selected altitude.

In an example implementation, the first mode may be an explore mode, and the second mode may be a control mode. As such, the control system may be arranged to select between the explore and control modes at block 604. The process of making a selection between these modes may responsively occur every time that the control system receives an information update, may occur periodically, and/or may be responsive to other trigger events. Moreover, this selection may be based on various considerations, such as considerations related to the flight data for the particular aerial vehicle for instance. Each such consideration may be given a certain weight in the process of making the selection. For instance, the selection process may be treated as an optimization problem (e.g., using optimization techniques that are currently known or developed in the future) with each consideration being a constraint that is given a certain weight and with the solution to the problem being an indication of the mode to select. Additionally or alternatively, one or more considerations may each be applied as a "hard rule" and may thus solely or in combination cause the selection of the explore mode or selection of the control mode. Several example considerations are described below.

i. Making a Selection Based on Level of Uncertainty about the Environment

In one case, the control system may make the selection based on a level of uncertainty about the environment, such as a level of uncertainty about wind velocities and/or directions at specific altitudes for instance. The level of uncertainty may be a metric that is defined in various ways. For instance, the levels may be defined as a number range, such as one to ten. And within this number range, higher numbers (e.g., ten) may represent higher levels of uncertainty and lower numbers may represent lower levels of uncertainty (e.g., one). Other instances are possible as well.

The control system may determine the level of uncertainty in various ways. For example, the control system may determine the level of uncertainty by comparing sets of data within the flight data. In particular, the control system may determine a first set of data that is representative of most recently recorded respective wind conditions (e.g., wind velocity and/or direction) at a given altitude (or two or more altitudes) as well as a second set of data that is representative of one or both of (i) historical respective wind conditions at the given altitude and (ii) predicted future wind conditions at the given altitude. Once the first and second sets of data are determined, the control system may then compare the data sets as further discussed below.

More specifically, the control system may determine the sets of data in various ways. For instance, the control system may receive wind-related data from the particular aerial vehicle, from other aerial vehicle, and/or from other entities, such as from the GFS provided by NOAA. In doing so, the control system may record the data and/or may obtain the data on an as needed basis. Moreover, the control system may determine timing information associated with the data. For instance, the control system may time stamp data packets or may otherwise record a time (e.g., time of day and/or date etc.) that one or more of various wind conditions were encountered. Further, the control system may determine or may otherwise record average wind conditions and/or peak wind conditions (e.g., highest and lowest wind velocities) at various times and/or time ranges, among other possibilities.

With this approach, the control system may maintain or otherwise refer to a record of wind conditions that occur at various times and could thus use that record to determine the most recently recorded (e.g., current) wind conditions and/or historical wind conditions. Furthermore, the control system may use historical and/or most recently recorded wind conditions to predict future wind conditions, such as using any weather prediction and/or modeling techniques currently known or developed in the future. Additionally or alternatively, the control system may receive the timing information and/or any other data related to wind conditions (e.g., predicted future wind conditions) from other entities, such as from the GFS provided by NOAA. Other instances are possible as well.

Further, the control system may compare the data sets in various ways and may thus determine the level of uncertainty in various ways. In one example implementation, wind-related data (e.g., from one or more of the data sets) may be used to determine how long wind conditions tend to remain relatively consistent (within a defined tolerance, for instance) at certain altitude and/or locations, thereby essentially evaluating how predictable wind conditions are over time. For instance, at a certain altitude in a certain location wind condition may tend to remain relatively consistent (e.g. predictable) for one hour periods. In this instance, if wind conditions were most recently recorded at a specific time, then predictability of wind conditions may begin to progressively decrease over time once one hour has passed since the specific time. And in another instance, at another altitude (perhaps in another location) wind condition may tend to remain relatively consistent (e.g. predictable) for six hour periods. In this instance, if wind conditions were most recently recorded at a specific time, then predictability of wind conditions may begin to progressively decrease over time once six hours have passed since the specific time.

As such, the control system may use the first data set (e.g., representative of most recently recorded respective wind conditions at a given altitude) to determine a specific duration of time since recording of the most recently recorded wind conditions at the given altitude. Also, the control system may use the second set of data (e.g., representative of one or both of (i) historical respective wind conditions at the given altitude and (ii) predicted future wind conditions at the given altitude) to determine an average duration for which respective wind conditions at the given altitude tend to remain substantially consistent. Once the control system determines the specific duration and the average duration, the control system may then determine a difference between these durations. That is, the control system may essentially determine how much time has passed since the wind conditions could still be substantially predictable. And once the control system determines the difference, the control system may then determine a level of uncertainty corresponding to the difference. For instance, the level of uncertainty may proportionally increase as the difference increases.

Figure 7:
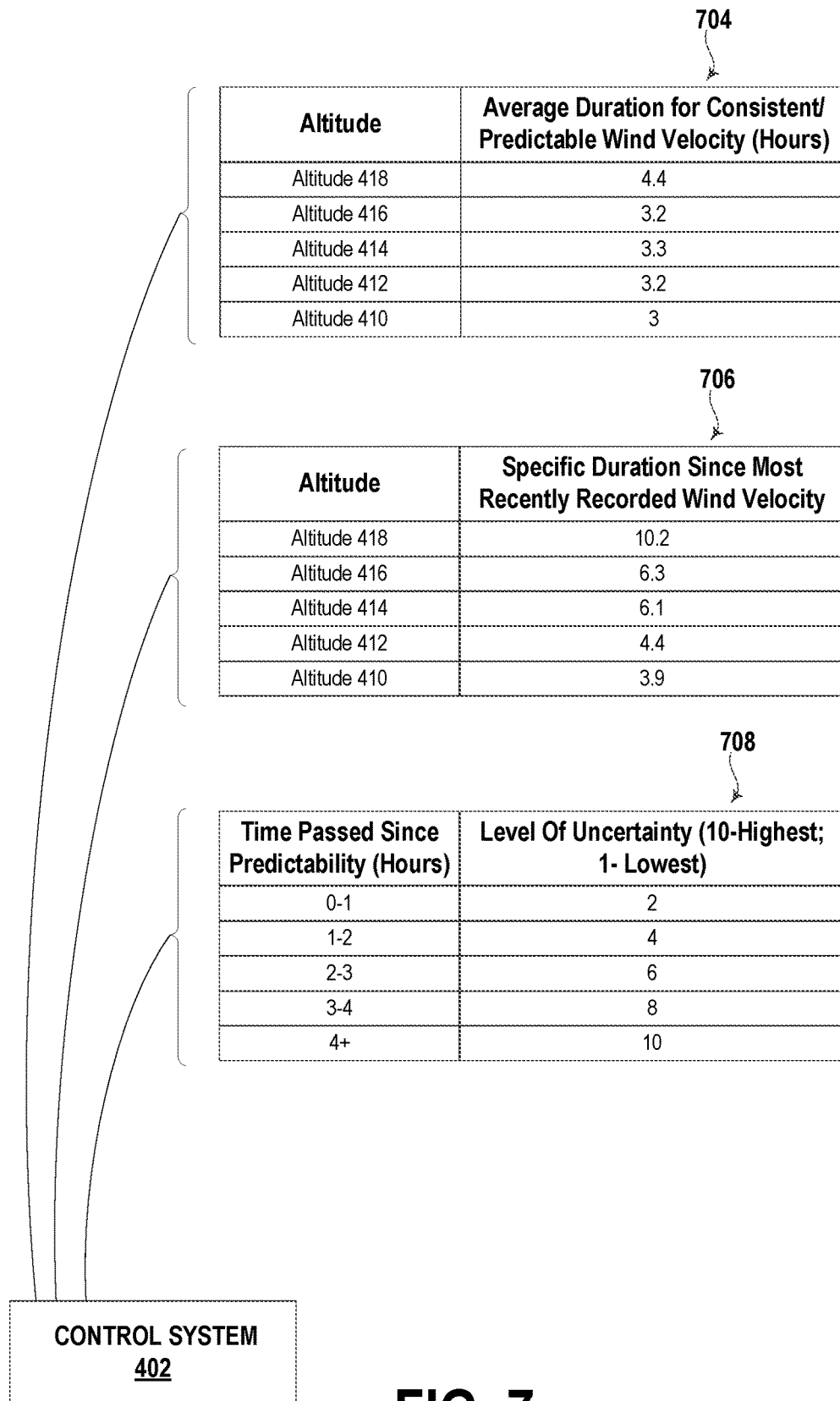
FIG. 7 illustrates an analysis for determining a level of uncertainty, according to an example embodiment.

FIG. 7 illustrates an example analysis for determining the level of uncertainty. More specifically, FIG. 7 shows the control system 402 having data (e.g., recorded or determined) stored thereon or having access to such data. In particular, the control system 402 may have duration data 704 representative of average duration for consistent/predictable wind velocity for each of the altitudes 410-418. Also, the control system 402 may have duration data 706 representative of specific duration since most recently recorded wind velocity for each of the altitudes 410-418. Further, the control system 402 may have mapping data 708 that maps times passed since predictability (e.g. difference between an average duration and a specific duration) to respective levels of uncertainty.

With this arrangement, the control system could determine a corresponding difference for a given altitude and could then use the difference to determine the corresponding level of uncertainty. In one example, when evaluating the altitude 410, the control system 402 may determine that the difference between the specific duration (e.g., 3.9 hours) and the average duration (e.g., 3 hours) is 0.9 hours. Hence, the control system 402 may determine that 0.9 hours have passed since predictability at altitude 410 and, based on mapping data 708, may determine that the corresponding level of uncertainty is at a level of 2 (two).

In another example, when evaluating the altitude 412, the control system 402 may determine that the difference between the specific duration (e.g., 4.4 hours) and the average duration (e.g., 3.2 hours) is 1.2 hours. Hence, the control system 402 may determine that 1.2 hours have passed since predictability at altitude 412 and, based on mapping data 708, may determine that the corresponding level of uncertainty is at a level of 4 (four).

In yet another example, when evaluating the altitude 414, the control system 402 may determine that the difference between the specific duration (e.g., 6.1 hours) and the average duration (e.g., 3.3 hours) is 2.8 hours. Hence, the control system 402 may determine that 2.8 hours have passed since predictability at altitude 414 and, based on mapping data 708, may determine that the corresponding level of uncertainty is at a level of 6 (six).

In yet another example, when evaluating the altitude 416, the control system 402 may determine that the difference between the specific duration (e.g., 6.3 hours) and the average duration (e.g., 3.2 hours) is 3.1 hours. Hence, the control system 402 may determine that 3.1 hours have passed since predictability at altitude 416 and, based on mapping data 708, may determine that the corresponding level of uncertainty is at a level of 8 (eight).

In yet another example, when evaluating the altitude 418, the control system 402 may determine that the difference between the specific duration (e.g., 10.2 hours) and the average duration (e.g., 4.4 hours) is 5.8 hours. Hence, the control system 402 may determine that 5.8 hours have passed since predictability at altitude 418 and, based on mapping data 708, may determine that the corresponding level of uncertainty is at a level of 10 (ten). Other examples are possible as well.

In another example implementation, the control system may determine a difference between data in the first set and data in the second set (e.g., differences in wind velocity/direction). And the control system may then determine a level of uncertainty corresponding to the determined difference. To do so, the control system may have stored or may otherwise have access to mapping data that maps certain difference in data to certain levels of uncertainty. So based on this mapping data, the control system may determine the level of uncertainty.

By way of example, the control system may refer to the historical (and/or predicted) wind data to determine average historical (and/or predicted) wind velocity/direction in a certain area and at a certain time period. And the control system may then compare this data to most recently recorded data representative of average wind velocity/direction in the same area and at a corresponding time period. In this comparison, the control system may determine a difference exists between the average historical wind velocity/direction and the most recently recorded average data. For instance, the average historical wind velocity may be 50 m/s and the most recently recorded average wind velocity (e.g., average wind velocity over the most recent hour) may be at 64 m/s. As such, the control system may determine a level of uncertainty (e.g., a level of 8 on a scale of 1-10) corresponding to the determined difference (i.e., 14 m/s difference). Other examples and example implementations are possible as well.

As noted, once the control system determines the level of uncertainty, the control system may then make a selection based at least in part on the level of uncertainty. In particular, the control system may determine whether the level of uncertainty is above or below a threshold level of uncertainty. So if the control system determined that the level of uncertainty is above the threshold level, then the control system may responsively select the explore mode. In particular, the control system may do this so as to explore wind conditions in the environment when such conditions are relatively uncertain. Whereas, if the control system determined that the level of uncertainty is below the threshold level, then the control system may responsively select the control mode. In particular, the control system may do this because the control system may be relatively certain regarding the wind conditions and could thus appropriately control movement of the particular aerial vehicle due to this certainty. Other approaches for making the selection based on the level of uncertainty are possible as well.

ii. Making a Selection Based on a Fixed Schedule

In another case, the control system may make the selection based on a fixed schedule that is provided or otherwise stored as part of the flight data. This fixed schedule may be applied for the particular aerial vehicle and could additionally be applied to various other aerial vehicles. Moreover, this fixed schedule may be provided by way of manual engineering input. Additionally or alternatively, this fixed schedule may be determined based on data obtained while various aerial vehicles are operated at the explore and control modes. For example, based on this data, the control system may determine that sufficient information can be obtained during explore mode (i.e., for selecting altitude(s) during control mode) when an aerial vehicle is operated at the explore mode periodically every four hours and for a duration of fifteen minutes at each period. As such, based on this determination, the control system may determine a fixed schedule to periodically switch to explore mode every four hours and for duration of fifteen minutes at each period. Other examples are also possible.

Regardless of how the fixed schedule is determined or provided, the fixed schedule may indicate one or more explore time frames during which the control system should operate the particular aerial vehicle according to the explore mode. Also, the fixed schedule may indicate one or more control time frames during which the control system should operate the particular aerial vehicle according to the explore mode. Generally the explore time frames and the control time frames may be non-overlapping. As such, the control system may make the selection based on this fixed schedule.

More specifically, the control system may determine a current time at a current location of the particular aerial vehicle (e.g., the control system may have access to a timer, a reference clock, and/or may otherwise obtain timing information from other entities). And the control system may then determine whether this current time is within at least one of the explore time frames or whether this current time is within at least one of the control time frames. The control system may make this determination periodically or continuously, among other possibilities. Nonetheless, if the control system determines that the current time is within at least one of the explore time frames, then the control system may responsively select the explore mode. Whereas, if the control system determines that the current time is within at least one of the control time frames, then the control system may responsively select the control mode.

Figure 8:
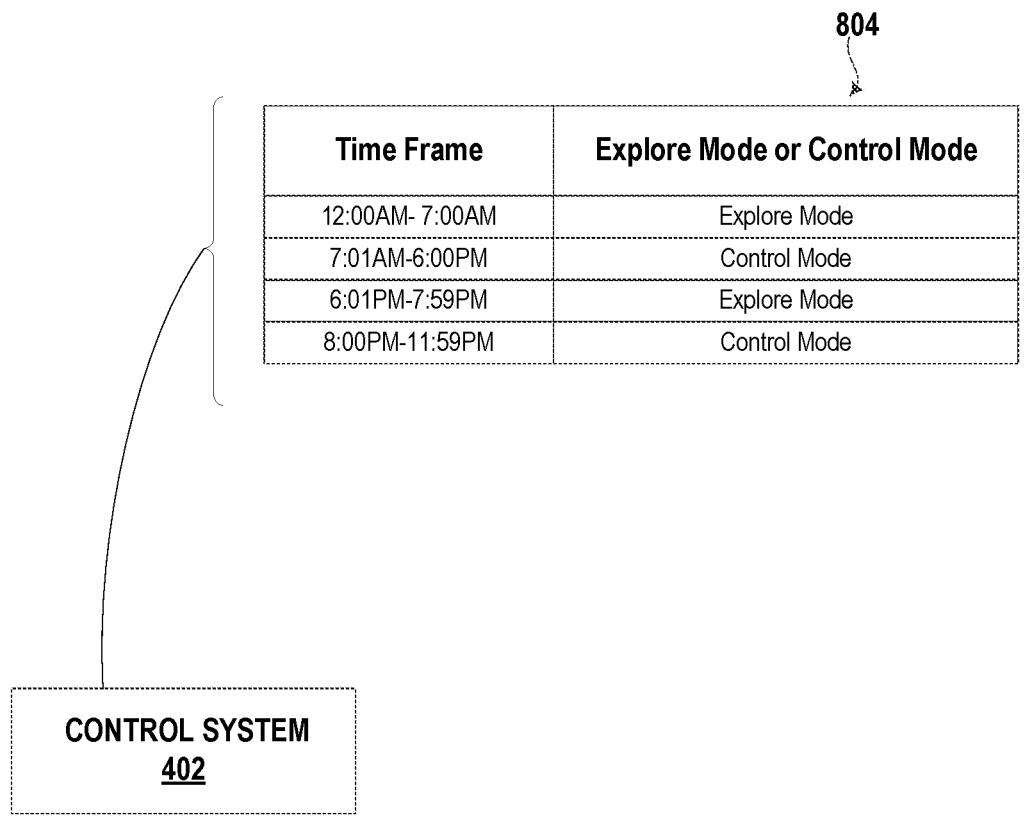
FIG. 8 illustrates a fixed schedule, according to an example embodiment.

FIG. 8 illustrates the control system 402 having stored or otherwise having access to an example fixed schedule 804. As shown, the control system 402 operates the particular aerial vehicle in accordance with the explore mode at the time frames of 12:00 AM to 7:00 AM as well as 6:01 PM to 7:59 PM. Whereas, the control system 402 operates the particular aerial vehicle in accordance with the control mode at the time frames of 7:01 AM to 6:00 PM as well as 8:00 PM to 11:59 PM. Other examples are possible as well.

iii. Making a Selection Based on Determined Movement Capabilities

In yet another case, the control system may make the selection based on the ability of the particular aerial vehicle to achieve a desired direction of travel and/or a desired velocity of travel, among other movement characteristics. The desired direction of travel and/or the desired velocity of travel may be requested by the particular aerial vehicle and/or may be determined by the control system. Further, the control system may determine these movement capabilities of the particular aerial vehicle in various ways.

For example, the control system may operate the particular aerial vehicle to move to a certain altitude at which the control system determines the particular aerial vehicle may achieve the desired movement. Once the particular aerial vehicle moves to that altitude, the control system may then determine whether the particular aerial vehicle is moving or capable of moving according to the desired movement. For instance, the control system may receive data related to movement of the particular aerial vehicle (e.g., direction of movement and/or velocity of movement) at that altitude and/or wind-related data (e.g., wind direction and/or wind velocity) at that altitude, which tends to correspond to the movement of the particular aerial vehicle. Based on the received data, the control system may then determine whether the particular aerial vehicle is moving or capable of moving according to the desired movement.

In another example, the control system may determine a desired direction and/or a desired velocity for the particular aerial vehicle, and the control system may responsively refer to stored mapping data to determine which altitude(s) would allow the particular aerial vehicle to achieve these movement characteristics. If the control system determines that the mapping indicates that no altitude allows for achieving such movement (e.g., there is no known altitude for achieving the movement characteristics and/or there is uncertainty in some altitudes as to whether these altitudes allow for achieving the movement characteristics), then the control system may responsively determine that the particular aerial vehicle is not capable of moving in the desired direction and/or at the desired velocity. Whereas, if the control system determines that the mapping indicates one or more altitudes that would allow for achieving such movement, then the control system may responsively determine that the particular aerial vehicle is capable of moving in the desired direction and/or at the desired velocity. Other examples are also possible.

As noted, once the control system determines the capability of the particular aerial vehicle to move in a particular direction and/or at a particular velocity, the control system may then make a selection based on these capabilities. So if the control system determines that the particular aerial vehicle is moving or is otherwise capable of moving in the desired direction and/or at the desired velocity, then the control system may responsively select the control mode. In particular, the control system may do so since these known capabilities may allow the control system to appropriately direct movement of the particular aerial vehicle. Whereas, if the control system determines that the particular aerial vehicle is not moving or is otherwise not capable of moving in the desired direction and/or at the desired velocity, then the control system may responsively select the explore mode. In particular, the control system may do this so as to essentially allow for exploration of various altitudes and thus potentially determine at least one altitude at which the particular aerial vehicle is capable of moving in the desired direction and/or at the desired velocity.

Figure 9A:
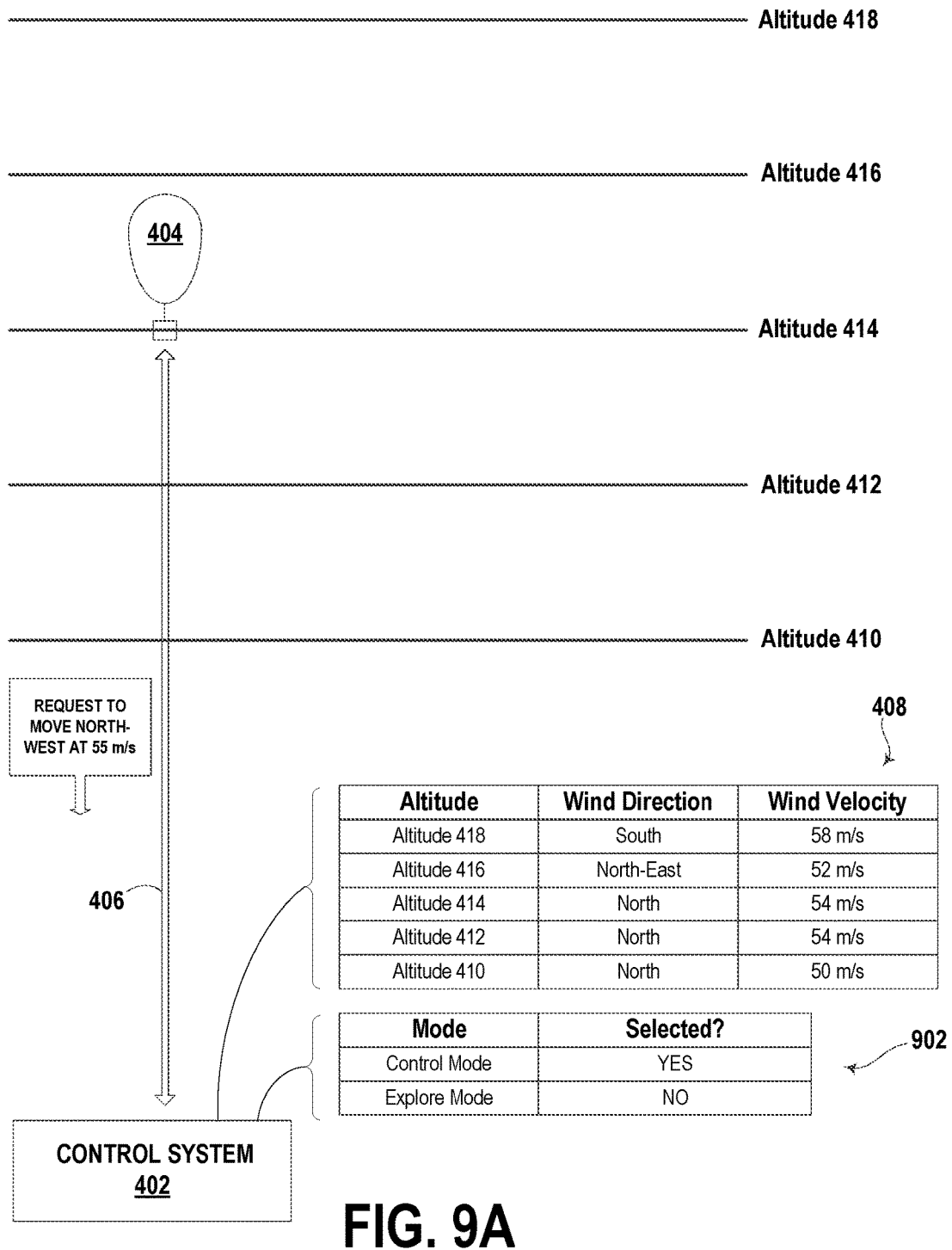
FIGS. 9A to 9D illustrate selection based on movement capabilities, according to an example embodiment.
Figure 9B:
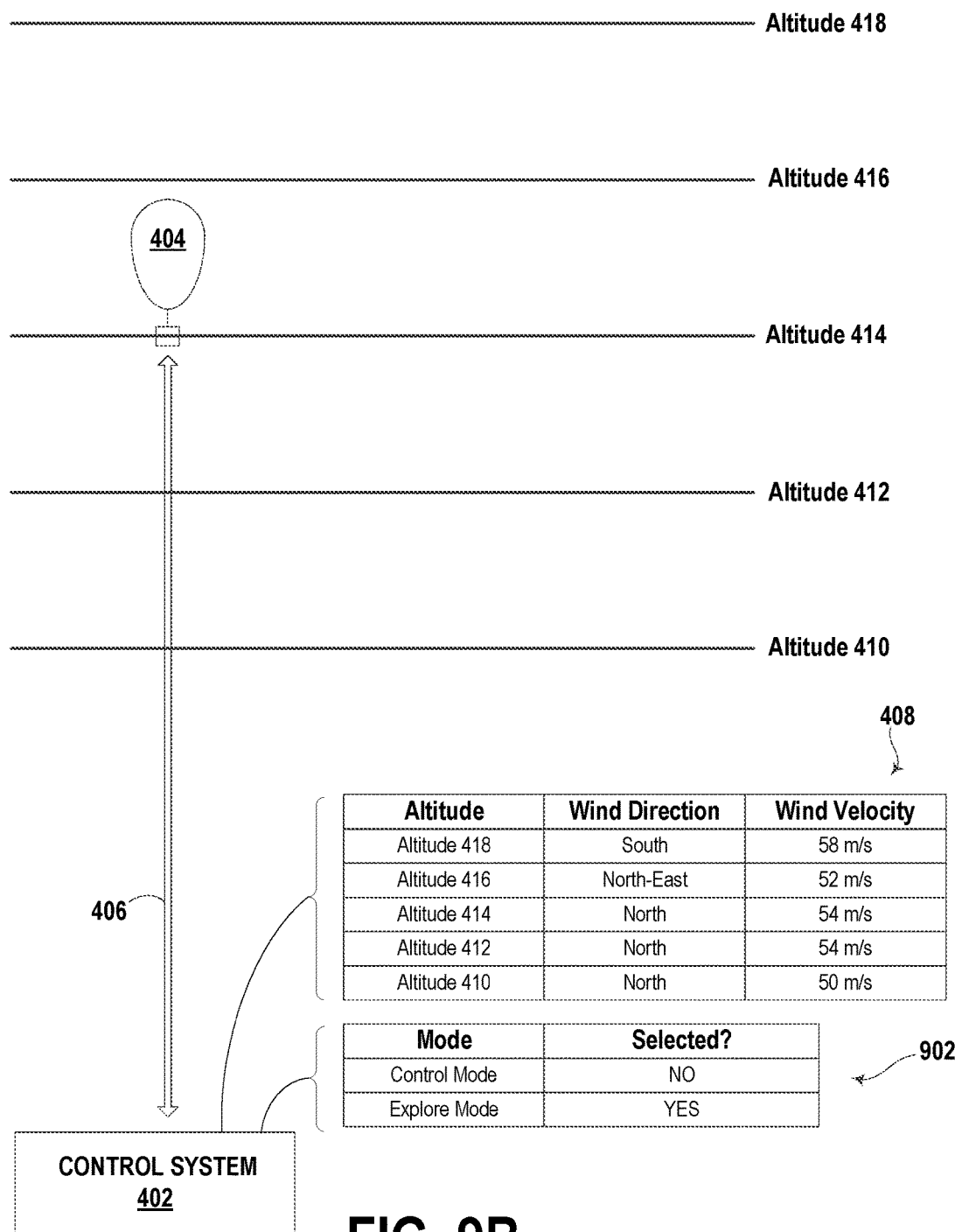

FIGS. 9A to 9D illustrates example selections based on movement capabilities. As shown in FIG. 9A, the control system 402 is operating the balloon 404 according to the control mode. While doing so, the control system 402 may receive from the balloon 404 a request to move in a north-western direction at a velocity of 55 m/s. Responsively, the control system 402 may refer to the mapping data 408 to determine whether the mapping data 408 indicates at least one altitude at which the balloon 404 is capable of moving in a north-western direction at a velocity of 55 m/s. Based on the mapping data 408, the control system 402 may determine that there is no known altitude at which the balloon 404 is capable of moving in a north-western direction at a velocity of 55 m/s. As such, the control system 402 may responsively select to then instead operate the balloon 404 according to the explore mode, as illustrated by data 902 in FIG. 9B. And the control system 402 may then direct the balloon 404 to explore various altitude during the explore mode (not shown).

Figure 9C:
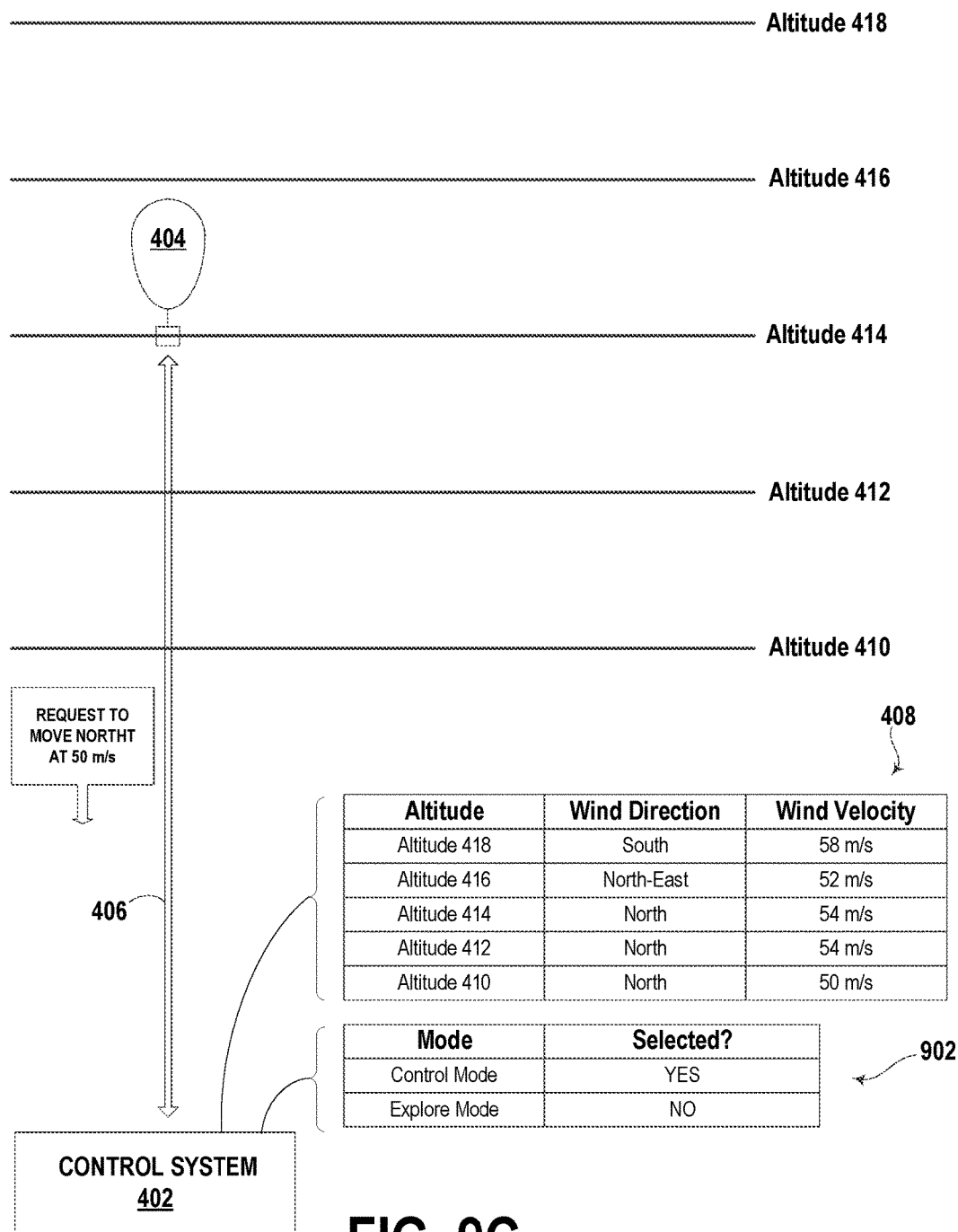
Figure 9D:
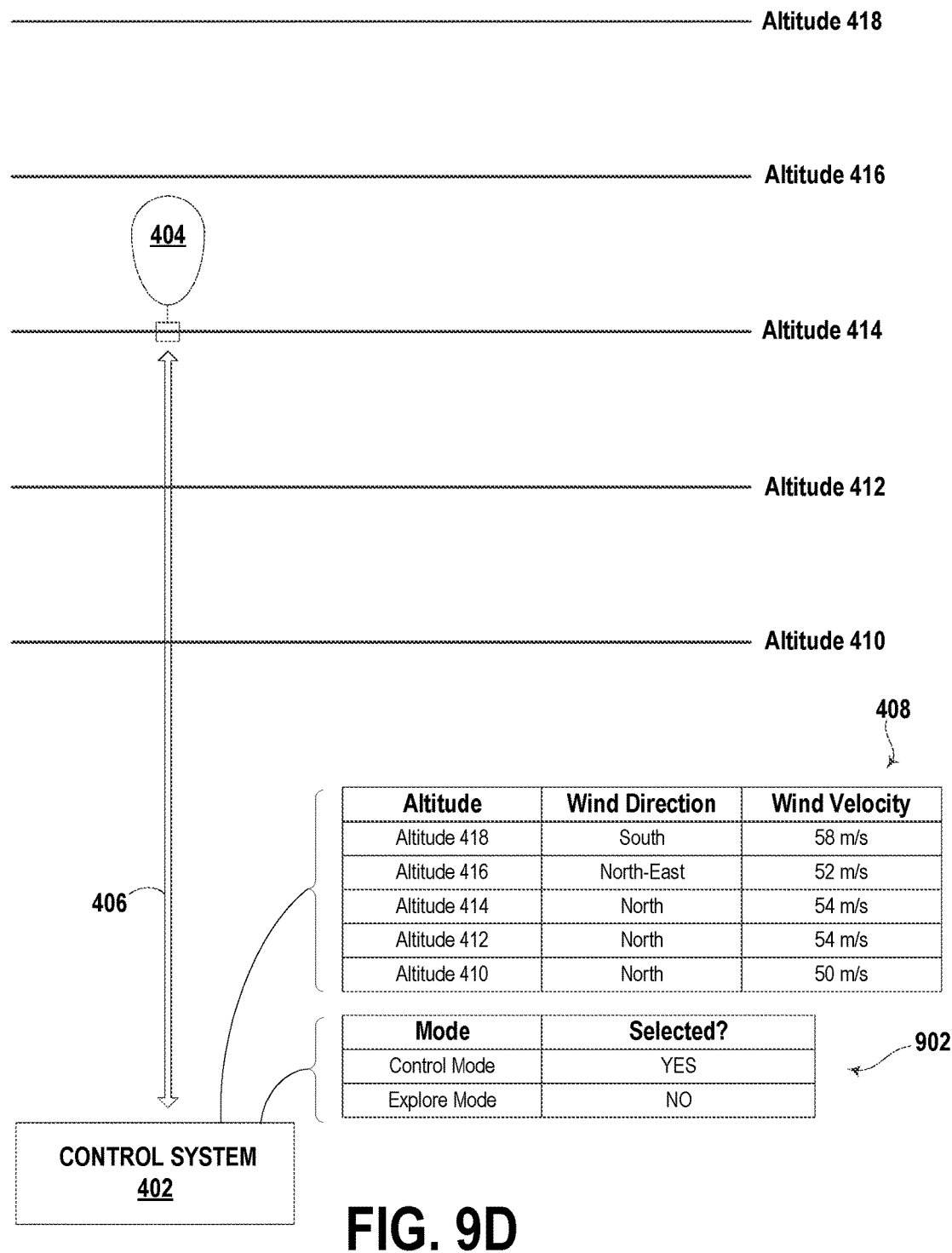

In further examples, as shown in FIG. 9C, the control system 402 is again operating the balloon 404 according to the control mode. While doing so, the control system 402 may receive from the balloon 404 a request to move in a northern direction at a velocity of 50 m/s. Responsively, the control system 402 may refer to the mapping data 408 to determine whether the mapping data 408 indicates at least one altitude at which the balloon 404 is capable of moving in a northern direction at a velocity of 50 m/s. Based on the mapping data 408, the control system 402 may determine that altitude 410 is an altitude at which the balloon 404 is capable of moving in a northern direction at a velocity of 50 m/s. As such, the control system 402 may responsively select to then continue operating the balloon 404 according to the control mode, as illustrated by data 902 in FIG. 9D. And the control system 402 may then direct the balloon 404 to move to altitude 410 so as to achieve the desired movement (not shown). Other examples and illustrations are possible as well.

iv. Making a Selection Based on Resource Availability

In yet another case, the control system may make the selection based on extent of resource availability associated with the particular aerial vehicle. In this case, information related to resource availability may be part of flight data (e.g., in form of sensor data and/or reports etc.) received from the particular aerial vehicle or otherwise obtained or determined by the control system in other ways. Further, the resources at issue may take various forms. For instance, the resources may include available energy levels, available level of processing power, available range of transmission, and/or available transmission configurations, among others. For simplicity, the selection is described below (without limitation) in the context available energy levels. It should be understood, however, that the process may extend to making a selection selection based on extent of availability of one or more of the above-mentioned resources and/or of other resources.

Accordingly, the control system may evaluate/determine current and/or predicted levels of energy for an energy storage/generation device coupled to the particular aerial vehicle (e.g., receiving this information from the particular aerial vehicle), and the control system may make the selection based on such levels of energy. In particular, the control system may determine whether a level of energy is below a threshold level of energy (e.g., established by way of manual engineering input) or whether the level of energy is above the threshold level of energy.

As such, if the control system determines that the level of stored energy is below the threshold level, then the control system may responsively select the control mode. The control system may do so due to the levels of energy consumption likely being higher when the particular aerial vehicle is operated at the explore mode compared to when the particular aerial vehicle is operated at the control mode, thereby exhibiting a need to consume less energy. Whereas, if the control system determines that the level of stored energy is above the threshold level, then the control system may responsively select the explore mode. The control system may do so because the explore mode generally results in more movement of the particular aerial vehicle and thus may demand higher levels of energy, thereby exhibiting an opportunity to use a relatively high extent of available energy to essentially gather additional data during the explore mode.

By way of example, the particular aerial vehicle may be equipped with solar panels and the control system may determine (e.g., based on predicted weather data received from the GFS of the NOAA) that these solar panels may provide for surplus energy. In this example, the control system may thus select the explore mode, so that the surplus energy isn't wasted and so that additional data may be gathered during the explore mode. Other examples are possible as well.

Figure 10A:
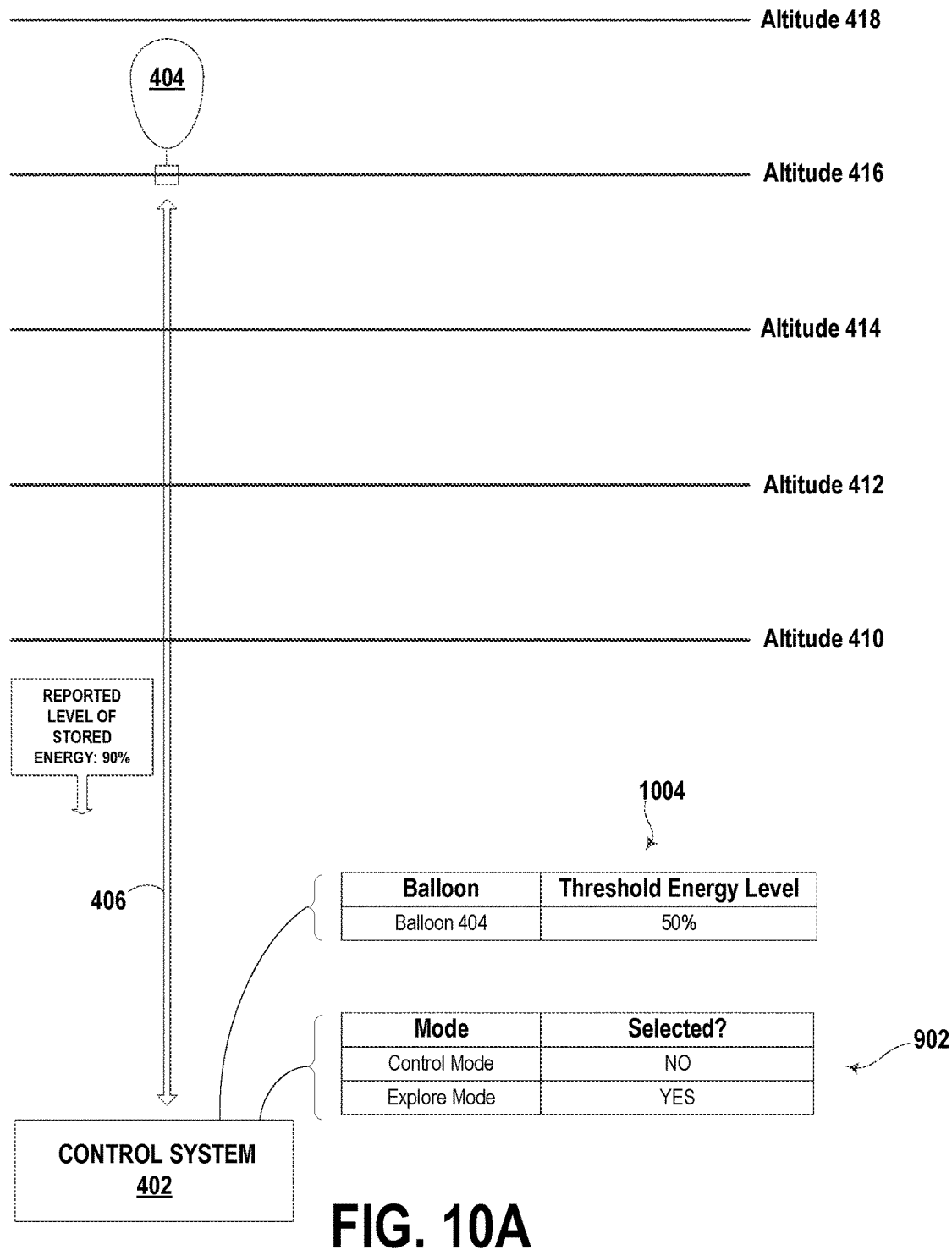
FIG. 10A to 10B illustrate selection based on resource availability, according to an example embodiment.
Figure 10B:
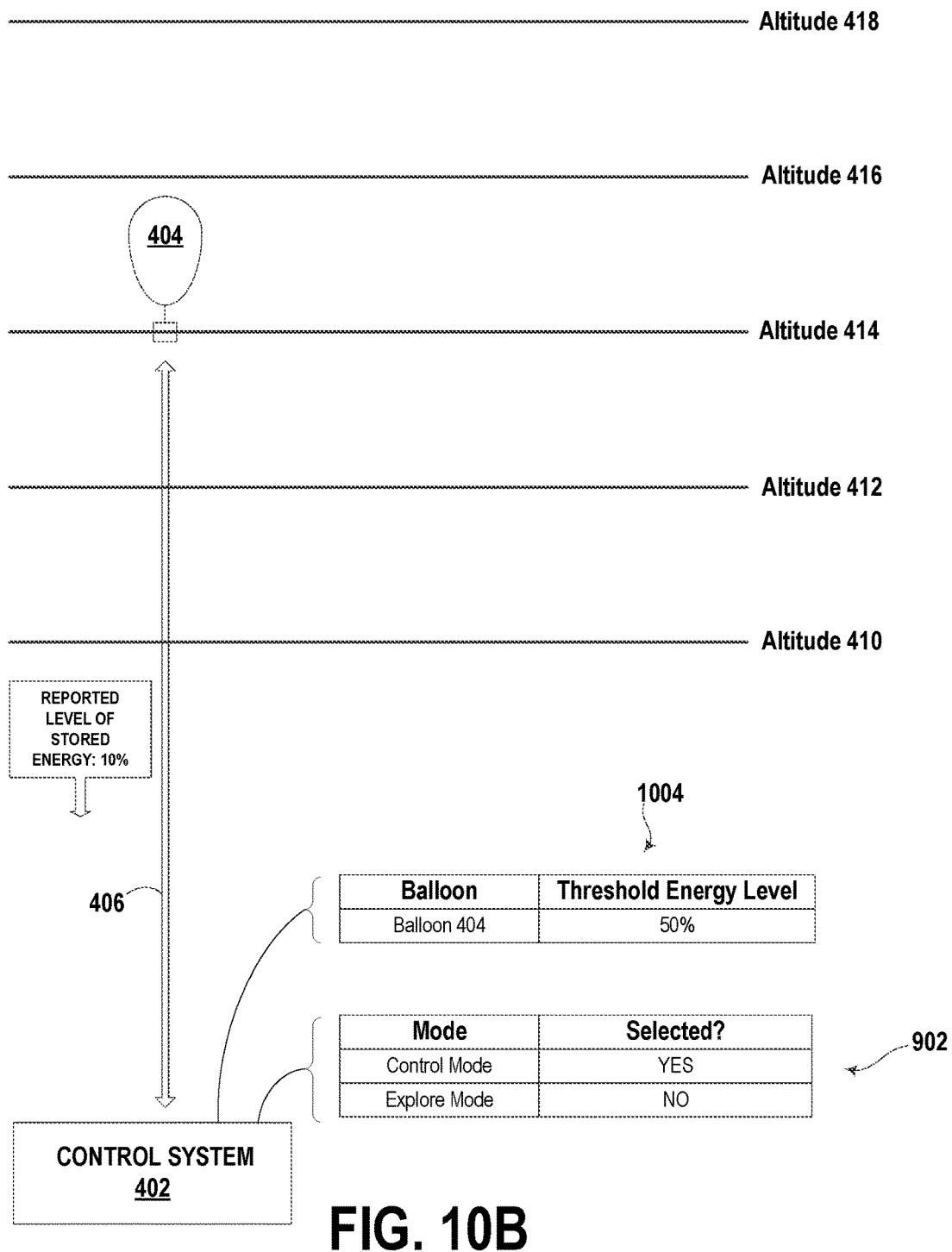

FIGS. 10A to 10B illustrate selections based on resource availability. In particular, FIG. 10A illustrates the balloon 404 flying at altitude 416 and, while doing so, reporting a level of stored energy to the control system 402. Once the control system 402 receives the report, the control system 402 may determine that the level of stored energy is at ninety percent (90%). Responsively, the control system 402 may then refer to stored or otherwise obtained data 1004 indicating a threshold energy level corresponding to the balloon 404 (e.g., fifty percent (50%)). Based on this data 1004, the control system 402 may then determine that the reported level of stored energy is above the threshold energy level. Responsively, the control system 402 may then select to operate the balloon according to the explore mode as illustrated by data 902 in FIG. 10A.

Furthermore, FIG. 10B illustrates the balloon 404 flying at altitude 416 at a later point in time and, while doing so, again reporting the level of stored energy to the control system 402. Once the control system 402 receives the report, the control system 402 may determine that the level of stored energy is at ten percent (10%). Responsively, the control system 402 may then refer to stored or otherwise obtained data 1004 indicating the threshold energy level corresponding to the balloon 404 (e.g., fifty percent (50%)). Based on this data 1004, the control system 402 may then determine that the reported level of stored energy is below the threshold energy level. Responsively, the control system 402 may then select to operate the balloon according to the control mode as illustrated by data 902 in FIG. 10B. Other examples and illustrations are possible as well.

v. Making a Selection Based on Provided Services

In yet another case, the control system may make the selection based on services being provided by the particular aerial vehicle. The information related to these services may be part of part of flight data (e.g., in form of sensor data and/or reports etc.) received from the particular aerial vehicle or otherwise obtained or determined by the control system in other ways. So in this case, the control system may initially make a determination of service currently being (or about to be) provided in a current coverage area of the particular aerial vehicle, and the control system may make the selection based on this determination. This approach may be carried out in one of several example implementations.

In one example implementation, the selection may be simply based on whether or not the particular aerial vehicle is currently providing service to one or more computing devices located in the current coverage area. More specifically, if the control system determines that the particular aerial vehicle is not currently providing coverage to any computing devices, then the control system may responsively select the explore mode. The control system may do so because the particular aerial vehicle could afford to change the coverage area due to lack of computing devices currently being served within the current coverage area. That is, this change of coverage area could be a result of the explore mode involving more movement of the particular aerial vehicle (e.g., through a larger altitude range) compared to movement of the particular aerial vehicle during the control mode.

Whereas, if the control system determines that the particular aerial vehicle is currently providing coverage to one or more computing devices located in the current coverage area, then the control system may responsively select the control mode. The control system may do this so that the particular aerial vehicle can be controlled to continue providing coverage in the area of the device rather than the particular aerial vehicle being operated at the explore mode and thus the particular aerial vehicle potentially changing the coverage area as it is navigating through a plurality of altitudes.

In another example implementation, the selection may be based on availability of other aerial vehicles to provide service. In particular, if the control system determines that the particular aerial vehicle is not currently providing coverage to any computing devices, then the control system may responsively select the explore mode as discussed above. Whereas, if the control system determines that the particular aerial vehicle is currently providing coverage to one or more computing devices located in the current coverage area, then the control system may responsively whether one or more other aerial vehicles are available to provide services to the one or more computing device in this coverage (e.g., have available bandwidth and/or are not respectively providing services to any other devices).

To do so, the control system may refer to data storage or may otherwise obtain (e.g., from other aerial vehicles and/or entities) data indicating the services being provided by each of various aerial vehicles (e.g., data indicating extent of used bandwidth, listing of device being provided with service, and/or respective locations at which the aerial vehicles provide service). And based on this data, the control system may determine which (if any) aerial vehicle are available to provide service to the one or more computing devices currently being served by the particular aerial vehicle in the current coverage area.

As such, if the control system determines that at least one aerial vehicle is currently available to provide service to these one or more computing device located in the current coverage area, then the control system may responsively select the explore mode. The control system may do so because other aerial vehicles can essentially take over and thus provide service to these devices while the particular aerial vehicle navigates to various altitudes during explore mode. Alternatively, the control system could responsively select the control mode and thus have the particular aerial vehicle continue providing service to these devices. However, in doing so, the control system could meanwhile responsively operate one or more other vehicles in explore mode so as to obtain any information as necessary and then perhaps use that obtained information to appropriately operate the particular aerial vehicle according to the control mode.

In contrast, if the control system determines that no other aerial vehicle is currently available to provide service to these one or more computing devices located in the current coverage area, then the control system may responsively select the control mode. The control system may do so because no other aerial vehicles can take over and thus provide service to these devices while the particular aerial vehicle navigates to various altitudes during explore mode, thereby exhibiting a need to continue operating the particular aerial vehicle according to the control mode so as to have the particular aerial vehicle continue to appropriately provide coverage to these devices.

In yet another example implementation, the selection may be based on availability of the particular aerial vehicle to continue providing service while being operated according to the explore mode. More specifically, the control system may determine whether or not the particular aerial vehicle is capable of continuing to provide service in the current coverage area while the particular aerial vehicle is being operated according to the explore mode. The control system may so in various ways.

For instance, the control system may determine a range of coverage (e.g., based on transmission power) of the particular aerial vehicle defining the maximum distance away from a device at which the particular aerial vehicle may be located while still providing service to the device at issue (e.g., providing any service or providing a threshold high quality of service). Also, the control system may determine altitudes through which the particular aerial vehicle is to navigate through if operated according to the explore mode. For each such altitude, the control system may then determine whether the particular aerial vehicle would be located at a distance within the maximum distance if the particular aerial vehicle were to be located at a respective altitude.

So if the particular aerial vehicle would be located at a distance within the maximum distance at each of these altitudes, then the control system may determine that the particular aerial vehicle is capable of continuing to provide service in the current coverage area while the particular aerial vehicle is being operated according to the explore mode. And if the particular aerial vehicle would be located at a distance larger than the maximum distance at at least one these altitudes, then the control system may determine that the particular aerial vehicle is not capable of continuing to provide service in the current coverage area while the particular aerial vehicle is being operated according to the explore mode. Other instances are possible as well.

As such, if the control system determines that the particular aerial vehicle is capable of continuing to provide service in the current coverage area while the particular aerial vehicle is being operated according to the explore mode, then the control system may responsively select the explore mode. Whereas, if the control system determines that the particular aerial vehicle is not capable of continuing to provide service in the current coverage area while the particular aerial vehicle is being operated according to the explore mode, then the control system may responsively select the control mode. Other implementations are possible as well.

Figure 11A:
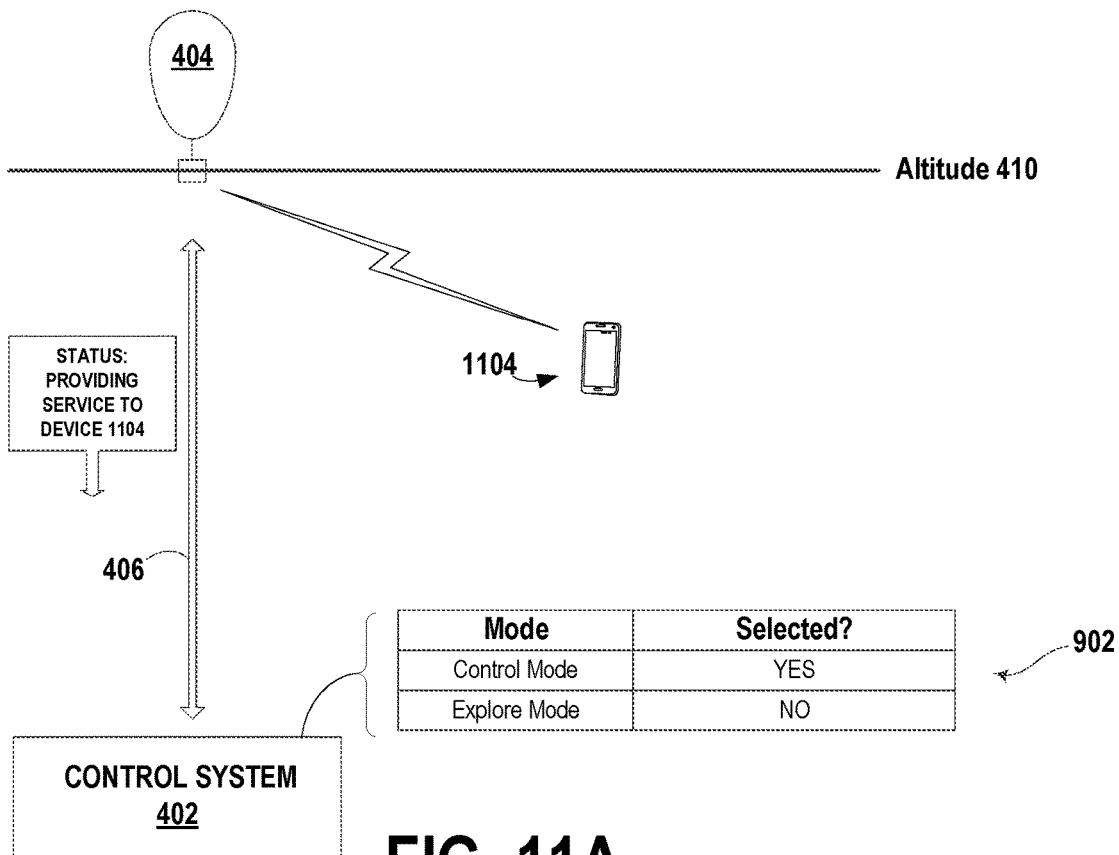
FIGS. 11A to 11B illustrate selection based on service being provided, according to an example embodiment.
Figure 11B:
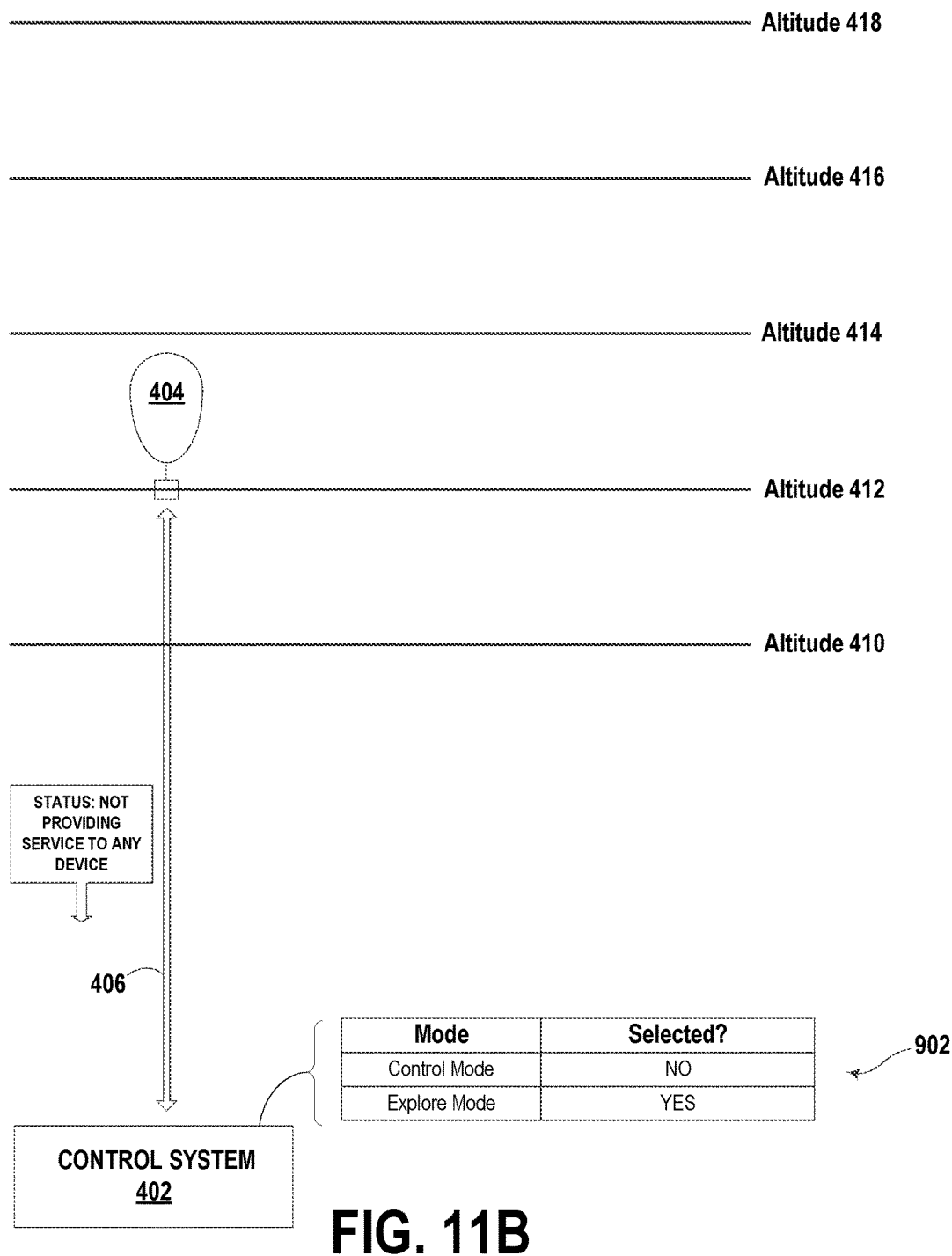

FIGS. 11A to 11B illustrate selection based on services being provided. In particular, FIG. 11A illustrates the balloon 404 flying at altitude 410 and, while doing so, reporting a service status to the control system 402. Once the control system 402 receives the service status, the control system 402 may determine that the particular aerial vehicle is providing service to device 1104 (as shown in FIG. 11A). Based on this status, the control system 402 may then responsively operate the balloon 404 according to the control mode as illustrated by data 902 in FIG. 11A. Furthermore, FIG. 11B illustrates the balloon 404 flying at altitude 412 at a later point in time and, while doing so, again reporting another service status to the control system 402. Once the control system 402 receives the new service status, the control system 402 may determine that the particular aerial vehicle is not providing service to any device. Based on this new status, the control system 402 may then responsively operate the balloon 404 according to the explore mode as illustrated by data 902 in FIG. 11B. Other examples and illustrations are possible as well.

C. Operating the Aerial Vehicle According to the Selected Mode

At block 606, method 600 involves, based on the selection, the control system operating the particular aerial vehicle according to the first mode or operating the particular aerial vehicle according to the second mode.

Once the control system selects a mode in accordance with which the particular aerial vehicle, the control system may then operate the particular aerial vehicle in accordance with the selected mode and may do as discussed above. Moreover, operating the particular vehicle may involve switching between modes or maintaining the same mode. In particular, if the control system selects the explore mode, then the control system may switch from operating the particular aerial vehicle according to the control mode to operating the particular aerial vehicle according to the explore mode. Alternatively, the control system may continue operating the particular aerial vehicle according to the explore mode if the particular aerial vehicle is already being operated according to the explore mode. Similarly, if the control system selects the control mode, then the control system may switch from operating the particular aerial vehicle according to the explore mode to operating the particular aerial vehicle according to the control mode. Alternatively, the control system may continue operating the particular aerial vehicle according to the control mode if the particular aerial vehicle is already being operated according the control mode.

Further, the control system may inform the particular aerial vehicle of the selected mode (e.g., by way of a communication via a communication link), so that the particular aerial vehicle can responsively reconfigure and/or carry out various operations based on (e.g., in preparation for being operated in accordance with) the selected mode. For example, if the explore mode is selected, then the particular aerial vehicle may responsively calibrate one or more sensors, such as sensors that obtain wind-related data for instance. And in another example, if the control mode is selected, then the particular aerial vehicle may calibrate the optical communication system and/or an RF communication system, such as in preparation for potentially providing service to a device for instance. Other examples are possible as well.

V. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device. Moreover, a block that represents one or more information transmissions may correspond to information transmissions between software and/or hardware modules in the same physical device. However, other information transmissions may be between software modules and/or hardware modules in different physical devices.

We claim:

1. A method comprising:
 determining, by a control system, flight data for a particular aerial vehicle in an aerial network comprising a plurality of aerial vehicles;
 based at least in part on the flight data, the control system making a selection between a first mode and a second mode, wherein operation in the first mode comprises the control system (i) directing the particular aerial vehicle to navigate to each of a plurality of altitudes and (ii) determining respective wind-related data at each respective altitude of the plurality of altitudes, and wherein operation in the second mode comprises the control system (i) selecting at least one altitude based at least in part on the determined wind-related data and (ii) directing the particular aerial vehicle to reposition to the at least one selected altitude; and based on the selection, the control system operating the particular aerial vehicle according to the first mode or operating the particular aerial vehicle according to the second mode, wherein determining the flight data comprises determining a fixed schedule that indicates (i) one or more first time frames during which the control system is to operate the particular aerial vehicle according to the first mode and (ii) one or more second time frames during which the control system is to operate the particular aerial vehicle according to the second mode, and wherein making the selection is based at least in part on the determined fixed schedule.

2. The method of claim 1, wherein determining respective wind-related data at each respective altitude of the plurality of altitudes comprises determining one or more of the following parameters: (a) respective wind direction at each respective altitude of the plurality of altitudes and (b) respective wind velocity at each respective altitude of the plurality of altitudes.

3. The method of claim 1, making the selection based at least in part on the determined fixed schedule comprises:

determining a current time at a current location of the particular aerial vehicle;

determining whether the current time is within at least one of the one or more first time frames or whether the current time is within at least one of the one or more second time frames;

if the determination is that the current time is within at least one of the one or more first time frames, then responsively selecting the first mode; and if the determination is that the current time is within at least one of the one or more second time frames, then responsively selecting the second mode.

4. The method of claim 1, wherein the first mode comprises an explore mode, and wherein the second mode comprises a control mode.

5. A method comprising:

determining, by a control system, flight data for a particular aerial vehicle in an aerial network comprising a plurality of aerial vehicles;

based at least in part on the flight data, the control system making a selection between a first mode and a second mode, wherein operation in the first mode comprises the control system (i) directing the particular aerial vehicle to navigate to each of a plurality of altitudes and (ii) determining respective wind-related data at each respective altitude of the plurality of altitudes, and wherein operation in the second mode comprises the control system (i) selecting at least one altitude based at least in part on the determined wind-related data and (ii) directing the particular aerial vehicle to reposition to the at least one selected altitude; and based on the selection, the control system operating the particular aerial vehicle according to the first mode or operating the particular aerial vehicle according to the second mode, wherein determining the flight data comprises determining a level of uncertainty related to respective wind conditions at at least one respective altitude of the plurality of altitudes, wherein making the selection is based at least in part on the determined level of uncertainty, and wherein determining the level of uncertainty comprises:

determining a first set of data representative of most recently recorded respective wind conditions at the at least one respective altitude;

determining a second set of data representative of one or more of the following conditions: (i) historical respective wind conditions at the at least one respective altitude and (ii) predicted future respective wind conditions at the at least one respective altitude;

comparing the first set of data to the second set of data; and determining the level of uncertainty based on the comparison.

6. The method of claim 5, wherein comparing the first set of data to the second set of data comprises:

based on the first set of data, determining a specific duration since recording of the most recently recorded respective wind conditions at the at least one respective altitude;

based on the second set of data, determining an average duration for which respective wind conditions at the at least one respective altitude remain substantially consistent;

determining a difference between the specific duration and the average duration; and determining the level of uncertainty corresponding to the difference.

7. The method of claim 5, wherein making the selection based at least in part on the determined level of uncertainty comprises:

determining whether the determined level of uncertainty is above a threshold level of uncertainty or whether the determined level of uncertainty is below the threshold level of uncertainty;

if the determination is that the determined level of uncertainty is above the threshold level of uncertainty, then responsively selecting the first mode; and if the determination is that the determined level of uncertainty is below the threshold level of uncertainty, then responsively selecting the second mode.

8. A method comprising:

determining, by a control system, flight data for a particular aerial vehicle in an aerial network comprising a plurality of aerial vehicles;

based at least in part on the flight data, the control system making a selection between a first mode and a second mode, wherein operation in the first mode comprises the control system (i) directing the particular aerial vehicle to navigate to each of a plurality of altitudes and (ii) determining respective wind-related data at each respective altitude of the plurality of altitudes, and wherein operation in the second mode comprises the control system (i) selecting at least one altitude based at least in part on the determined wind-related data and (ii) directing the particular aerial vehicle to reposition to the at least one selected altitude; and based on the selection, the control system operating the particular aerial vehicle according to the first mode or operating the particular aerial vehicle according to the second mode, wherein determining the flight data comprises determining capability of the particular aerial vehicle to move in a particular direction, and wherein making the selection is based at least in part on the determined capability of the particular aerial vehicle to move in the particular direction.

9. The method of claim 8, wherein making the selection based at least in part on the determined capability of the particular aerial vehicle to move in the particular direction comprises:

if the determination is that the particular aerial vehicle is capable of moving in the particular direction, then responsively selecting the second mode; and if the determination is that the particular aerial vehicle is not capable of moving in the particular direction, then responsively selecting the first mode.

10. A method comprising:

determining, by a control system, flight data for a particular aerial vehicle in an aerial network comprising a plurality of aerial vehicles;

based at least in part on the flight data, the control system making a selection between a first mode and a second mode, wherein operation in the first mode comprises the control system (i) directing the particular aerial vehicle to navigate to each of a plurality of altitudes and (ii) determining respective wind-related data at each respective altitude of the plurality of altitudes, and wherein operation in the second mode comprises the control system (i) selecting at least one altitude based at least in part on the determined wind-related data and (ii) directing the particular aerial vehicle to reposition to the at least one selected altitude; and based on the selection, the control system operating the particular aerial vehicle according to the first mode or operating the particular aerial vehicle according to the second mode, wherein determining the flight data comprises determining capability of the particular aerial vehicle to move at a particular velocity, and wherein making the selection is based at least in part on the determined capability of the particular aerial vehicle to move at the particular velocity.

11. The method of claim 10, wherein making the selection based at least in part on the determined capability of the particular aerial vehicle to move at the particular velocity comprises:

if the determination is that the particular aerial vehicle is capable of moving at the particular velocity, then responsively selecting the second mode; and if the determination is that the particular aerial vehicle is not capable of moving at the particular velocity, then responsively selecting the first mode.

12. A method comprising:

determining, by a control system, flight data for a particular aerial vehicle in an aerial network comprising a plurality of aerial vehicles;

based at least in part on the flight data, the control system making a selection between a first mode and a second mode, wherein operation in the first mode comprises the control system (i) directing the particular aerial vehicle to navigate to each of a plurality of altitudes and (ii) determining respective wind-related data at each respective altitude of the plurality of altitudes, and wherein operation in the second mode comprises the control system (i) selecting at least one altitude based at least in part on the determined wind-related data and (ii) directing the particular aerial vehicle to reposition to the at least one selected altitude; and based on the selection, the control system operating the particular aerial vehicle according to the first mode or operating the particular aerial vehicle according to the second mode, wherein determining the flight data comprises determining a level of energy stored in an energy storage device of the particular aerial vehicle, wherein making the selection is based at least in part on the determined level of energy, and wherein making the selection based at least in part on the determined level of energy comprises:

determining whether the level of energy is below a threshold level of energy or whether the level of energy is above the threshold level of energy;

if the determination is that the level of energy is below the threshold level of energy, then responsively selecting the second mode; and if the determination is that the level of energy is above the threshold level of energy, then responsively selecting the first mode.

13. A method comprising:

determining, by a control system, flight data for a particular aerial vehicle in an aerial network comprising a plurality of aerial vehicles;

based at least in part on the flight data, the control system making a selection between a first mode and a second mode, wherein operation in the first mode comprises the control system (i) directing the particular aerial vehicle to navigate to each of a plurality of altitudes and (ii) determining respective wind-related data at each respective altitude of the plurality of altitudes, and wherein operation in the second mode comprises the control system (i) selecting at least one altitude based at least in part on the determined wind-related data and (ii) directing the particular aerial vehicle to reposition to the at least one selected altitude; and based on the selection, the control system operating the particular aerial vehicle according to the first mode or operating the particular aerial vehicle according to the second mode, wherein determining the flight data comprises determining service currently being provided by the particular aerial vehicle in a current coverage area of the particular aerial vehicle, and wherein making the selection is based at least in part on the determined service currently being provided by the particular aerial vehicle in the current coverage area of the particular aerial vehicle.

14. The method of claim 13, wherein making the selection based at least in part on the determined service currently being provided by the particular aerial vehicle in the current coverage area of the particular aerial vehicle comprises:

if the particular aerial vehicle is currently not providing service to any computing devices, then responsively selecting the first mode; and if the particular aerial vehicle is currently providing service to at least one computing device located in the current coverage area, then responsively selecting the second mode.

15. The method of claim 13, wherein making the selection based at least in part on the determined service currently being provided by the particular aerial vehicle in the current coverage area of the particular aerial vehicle comprises:

if the particular aerial vehicle is currently not providing service to any computing devices, then responsively selecting the first mode;

if the particular aerial vehicle is currently providing service to at least one computing device located in the current coverage area, then responsively determining whether or not at least one other aerial vehicle of the plurality of aerial vehicles is currently available to provide service to the at least one computing device located in the current coverage area;

if the determination is that at least one other aerial vehicle of the plurality of aerial vehicles is currently available to provide service to the at least one computing device located in the current coverage area, then responsively selecting the first mode; and if the determination is that no other aerial vehicle of the plurality of aerial vehicles is currently available to provide service to the at least one computing device located in the current coverage area, then responsively selecting the second mode.

16. The method of claim 13, wherein making the selection based at least in part on the determined service currently being provided by the particular aerial vehicle in the current coverage area of the particular aerial vehicle comprises:

determining whether or not the particular aerial vehicle is capable of continuing to provide service in the current coverage area while the control system operates the particular aerial vehicle according to the first mode;

if the determination is that the particular aerial vehicle is capable of continuing to provide service in the current coverage area while the control system operates the particular aerial vehicle according to the first mode, then responsively selecting the first mode; and if the determination is that the particular aerial vehicle is not capable of continuing to provide service in the current coverage area while the control system operates the particular aerial vehicle according to the first mode, then responsively selecting the second mode.

17. A control system comprising:

one or more processors;

a non-transitory computer readable medium; and program instructions stored on the non-transitory computer readable medium and executable by the one or more processors to:

determine flight data for a particular aerial vehicle in an aerial network comprising a plurality of aerial vehicles;

based at least in part on the flight data, make a selection between a first mode and a second mode, wherein operation in the first mode comprises the one or more processors (i) directing the particular aerial vehicle to navigate to each of a plurality of altitudes and (ii) determining respective wind-related data at each respective altitude of the plurality of altitudes, and wherein operation in the second mode comprises the one or more processors (i) selecting at least one altitude based at least in part on the determined wind-related data and (ii) directing the particular aerial vehicle to reposition to the at least one selected altitude; and based on the selection, operate the particular aerial vehicle according to the first mode or operate the particular aerial vehicle according to the second mode, wherein determining the flight data comprises determining a fixed schedule that indicates (i) one or more first time frames during which the control system is to operate the particular aerial vehicle according to the first mode and (ii) one or more second time frames during which the control system is to operate the particular aerial vehicle according to the second mode, and wherein making the selection is based at least in part on the determined fixed schedule.

18. An aerial vehicle comprising:

one or more processors;

a non-transitory computer readable medium; and program instructions stored on the non-transitory computer readable medium and executable by the one or more processors to:

determine flight data for the aerial vehicle;

based at least in part on the flight data, make a selection between a first mode and a second mode, wherein operation in the first mode comprises the one or more processors (i) directing the aerial vehicle to navigate to each of a plurality of altitudes and (ii) determining respective wind-related data at each respective altitude of the plurality of altitudes, and wherein operation in the second mode comprises the one or more processors (i) selecting at least one altitude based at least in part on the determined wind-related data and (ii) directing the aerial vehicle to reposition to the at least one selected altitude; and based on the selection, operate the aerial vehicle according to the first mode or operate the aerial vehicle according to the second mode, wherein determining the flight data comprises determining a fixed schedule that indicates (i) one or more first time frames during which the control system is to operate the particular aerial vehicle according to the first mode and (ii) one or more second time frames during which the control system is to operate the particular aerial vehicle according to the second mode, and wherein making the selection is based at least in part on the determined fixed schedule.

* * * * *